US011416526B2

(12) United States Patent
Chen

(10) Patent No.: US 11,416,526 B2
(45) Date of Patent: Aug. 16, 2022

(54) EDITING AND PRESENTING STRUCTURED DATA DOCUMENTS

(71) Applicant: SAP SE, Walldorf (DE)

(72) Inventor: Hanxiang Chen, Burnaby (CA)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 16/882,318

(22) Filed: May 22, 2020

(65) Prior Publication Data

US 2021/0365481 A1 Nov. 25, 2021

(51) Int. Cl.
G06F 16/28 (2019.01)
G06F 40/166 (2020.01)
G06F 16/22 (2019.01)
G06F 40/205 (2020.01)
G06F 40/117 (2020.01)
G06F 40/284 (2020.01)

(52) U.S. Cl.
CPC ........ G06F 16/287 (2019.01); G06F 16/2246 (2019.01); G06F 40/117 (2020.01); G06F 40/166 (2020.01); G06F 40/205 (2020.01); G06F 40/284 (2020.01)

(58) Field of Classification Search
None
See application file for complete search history.

(56) References Cited

U.S. PATENT DOCUMENTS

| 7,191,394 | B1 | 3/2007 | Ardeleanu et al. | |
|---|---|---|---|---|
| 7,406,660 | B1 | 7/2008 | Sikchi et al. | |
| 7,584,420 | B2 | 9/2009 | Gaug et al. | |
| 8,375,293 | B2 | 2/2013 | Rosner et al. | |
| 8,429,179 | B1 * | 4/2013 | Mirhaji ................. | G06F 16/248 707/756 |
| 11,010,543 | B1 * | 5/2021 | Wesanekar ............ | G06F 40/177 |
| 2003/0120686 | A1 * | 6/2003 | Kim ...................... | G06F 40/143 |
| 2006/0161559 | A1 * | 7/2006 | Bordawekar ......... | G06F 40/143 |

(Continued)

OTHER PUBLICATIONS

Stankovic et al. "XML Framework for Various Types of Decision Diagrams for Discrete Functions", IEICE Transactions on Information and Systems, Nov. 2007, 10 pages.

(Continued)

Primary Examiner — Howard Cortes
(74) Attorney, Agent, or Firm — Fountainhead Law Group P.C.

(57) ABSTRACT

The present disclosure pertains to computer readable documents including structured data content for visualizing a structure with a plurality of structure elements and a plurality of relationships between the plurality of structure elements. The document includes the structured data content, a data type indicator, and a structure type indicator. The data type indicator is used to determine a parsing algorithm, The parsing algorithm and the structure type indicator are used to parse the structured data content to determine the structure elements and the relationships between the structure elements. The lexical structure of the structured data content reflects the relationships between the structure elements. A visualization of the structure can be automatically generated. The visualization can be linked to or embedded within visualizations of other structures.

21 Claims, 17 Drawing Sheets

(56) References Cited

U.S. PATENT DOCUMENTS

| | | | | |
|---|---|---|---|---|
| 2006/0184915 A1* | 8/2006 | DeGroote | ............. | G06F 40/166 |
| | | | | 717/106 |
| 2006/0253508 A1* | 11/2006 | Colton | ....................... | G06F 8/52 |
| 2007/0011183 A1* | 1/2007 | Langseth | .............. | G06F 16/313 |
| 2007/0027671 A1* | 2/2007 | Kanawa | ................ | G06F 40/143 |
| | | | | 704/4 |
| 2007/0094607 A1* | 4/2007 | Morgan | ................ | G06F 40/103 |
| | | | | 715/762 |
| 2008/0276201 A1* | 11/2008 | Risch | ....................... | G06F 16/34 |
| | | | | 715/853 |
| 2008/0282139 A1* | 11/2008 | Davis | .................... | G06F 40/111 |
| | | | | 715/205 |
| 2010/0250598 A1* | 9/2010 | Brauer | .................. | G06F 16/319 |
| | | | | 707/780 |
| 2012/0310875 A1* | 12/2012 | Prahlad | ............... | G06F 16/2465 |
| | | | | 707/602 |
| 2013/0335421 A1 | 12/2013 | Franz et al. | | |
| 2014/0067850 A1* | 3/2014 | Schrock | ................ | G06F 16/532 |
| | | | | 707/769 |
| 2014/0089332 A1* | 3/2014 | Maharana | ............... | G06F 16/86 |
| | | | | 707/755 |
| 2015/0135056 A1* | 5/2015 | Sekharan | .............. | G06F 16/972 |
| | | | | 715/234 |
| 2016/0078102 A1* | 3/2016 | Crouch | ................. | G06F 16/313 |
| | | | | 707/722 |
| 2017/0199926 A1* | 7/2017 | Driscoll | ................. | G06Q 10/10 |
| 2017/0270197 A1* | 9/2017 | Miracolo | ................ | G06F 16/93 |
| 2018/0121524 A1* | 5/2018 | Yousaf | .................. | G06F 16/248 |
| 2018/0165554 A1* | 6/2018 | Zhang | .................. | G06K 9/6256 |
| 2018/0189299 A1* | 7/2018 | Jaggars | ................... | G06F 16/13 |
| 2020/0117704 A1* | 4/2020 | Gadgil | .................. | G06F 16/986 |
| 2020/0242349 A1* | 7/2020 | Ferreira Moreno | ... | G06N 5/022 |
| 2020/0265188 A1* | 8/2020 | Nahamoo | ............. | G06F 40/205 |
| 2020/0320130 A1* | 10/2020 | Korpman | .............. | G06F 16/367 |
| 2020/0356531 A1* | 11/2020 | Fox | ....................... | G06F 16/355 |
| 2021/0174014 A1* | 6/2021 | Ross | ..................... | G06F 40/205 |
| 2021/0194888 A1* | 6/2021 | Bhaskar S | ............ | H04L 63/105 |

OTHER PUBLICATIONS

Anonymous "Plant UML", downloaded from website (www.plantuml.com) on Jan. 31, 2020, 1 page.

Christensen "Interactive Diagrams: 3 Ways to Use Hotspots and Layers in Lucidchart", downloaded from https://www.lucidchart.com/blog/interactive-diagrams-3-ways-to-use-hotspots-and-layers, 10 pages.

* cited by examiner

| memberA | memberB | BtoA | AtoB |
|---|---|---|---|
| Helen | Tom | husband | wife |
| Tom | Michael | father | son |
| Tom | Lily | daughter | father |
| Tom | Jason | son | father |
| Tom | Marry | Mother | son |
| Helen | Lily | daughter | mother |
| Helen | Jason | son | mother |
| Helen | Machael | father_in_law | daughter_in_law |
| Helen | Marry | mother_in_law | daughter_in_law |
| Lily | Jason | brother | sister |
| Lily | Michael | grand father | grand daughter |
| Lily | Marry | grand mother | grand daughter |
| Jason | Michael | grand father | grand son |
| Jason | Marry | grand mother | grand son |
| Michael | Marry | wife | husband |

*FIG. 7*

Series representation of Exponential function $$e^x = \sum_{k=0}^{\infty} \frac{x^k}{k!}$$

$$e^x = \sum_{k=-\infty}^{\infty} I_k(x)$$

$$e^x = \sum_{k=0}^{\infty} x^{-1+2k} \frac{(2k+x)}{(2k)!}$$

*FIG. 13*

EDITING AND PRESENTING STRUCTURED DATA DOCUMENTS

BACKGROUND

The present disclosure pertains to computer readable documents, and in particular to computer readable documents including structured data content for visualizing a structure with a plurality of structure elements and a plurality of relationships between the plurality of structure elements.

Certain document processing software applications (e.g., word processing applications or web browsers) are capable of presenting visualizations (e.g., charts, graphs, or diagrams) in addition to text. Authors of documents may include visualizations in order to improve the comprehension of the document by the reader. However, such visualizations may be presented as bitmap and vector graphics. Bitmap and vector graphics may provide colorful information without providing the underlying numbers or texts used to create the visualization (e.g., the information represented in a chart, graph, or diagram). Furthermore, visualizations presented as bitmap and vector graphics may not be modified by adding, removing, or changing the content used to generate the visualization since these values may not be available from bitmap data. Instead the information used to generate the visualization may need to be determined from the image and then the image may need to be re-drawn in order to modify the visualization. Another disadvantage of bitmap and vector graphics is that they may not allow the content in the visualization to be accurately searched. Another disadvantage of bitmap and vector graphics is that they may not allow for analysis and transformations to be performed on the content.

The present disclosure addresses these issue and others, as further described below.

SUMMARY

One embodiment provides a computer device. The computer device includes one or more processors. The computer device also includes machine-readable medium coupled to the one or more processors and storing computer program code. The computer program code includes sets instructions executable by the one or more processors. The instructions are executable to obtain a document including structured data content, a data type indicator, and a structure type indicator. The instructions are further executable to determine a parsing algorithm based on the data type indicator. The instructions are further executable to determine a structure including a plurality of structure elements and a plurality of relationships between the plurality of structure elements by parsing the structured data content using the parsing algorithm and the structure type indicator. The instructions are further executable to generate a visualization of the structure including the plurality of structure elements and the plurality of relationships between the plurality of structure elements.

Another embodiment provides one or more non-transitory computer-readable medium storing computer program code. The computer program code includes sets of instructions to obtain a document including structured data content, a data type indicator, and a structure type indicator. The computer program code further includes sets of instructions to determine a parsing algorithm based on the data type indicator. The computer program code further includes sets of instructions to determine a structure including a plurality of structure elements and a plurality of relationships between the plurality of structure elements by parsing the structured data content using the parsing algorithm and the structure type indicator. The computer program code further includes sets of instructions to generate a visualization of the structure including the plurality of structure elements and the plurality of relationships between the plurality of structure elements.

Another embodiment provides a computer-implemented method. The method includes obtaining a document including structured data content, a data type indicator, and a structure type indicator. The method further includes determining a parsing algorithm based on the data type indicator. The method further includes determining a structure including a plurality of structure elements and a plurality of relationships between the plurality of structure elements by parsing the structured data content using the parsing algorithm and the structure type indicator. The method further includes generating a visualization of the structure including the plurality of structure elements and the plurality of relationships between the plurality of structure elements.

The following detailed description and accompanying drawings provide a better understanding of the nature and advantages of the present disclosure.

BRIEF DESCRIPTION OF THE DRAWINGS

FIG. 7 shows a table that can be generated using structured data, according to an embodiment.

FIG. 13 shows a list of multiple embedded mathematical formulas that can be generated using structured data, according to an embodiment.

DETAILED DESCRIPTION

Figure 1:
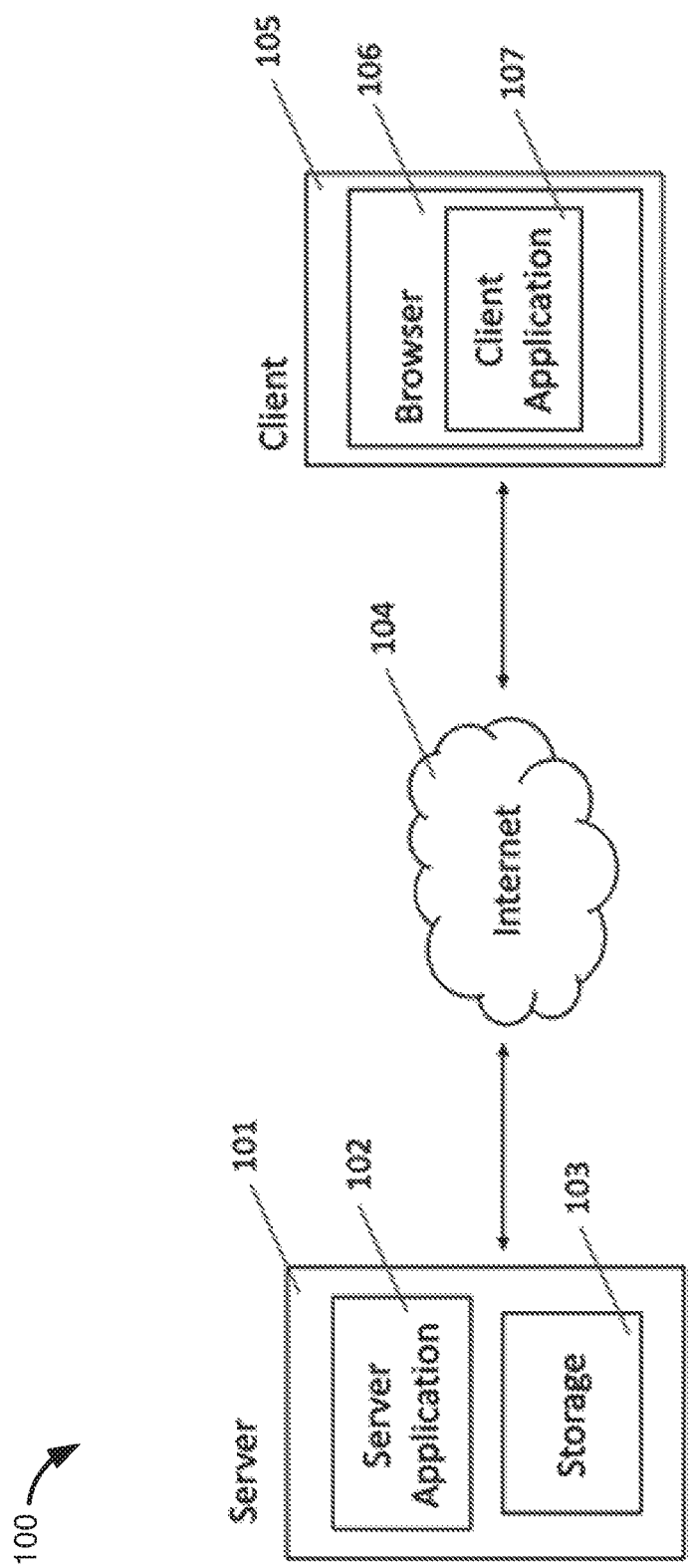
FIG. 1 shows a diagram of a server and a client, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As mentioned above, certain document processing software applications (e.g., word processing applications or web browsers) are capable of presenting visualizations (e.g., charts, graphs, or diagrams) in addition to text. Authors of documents may include visualizations in order to improve the comprehension of the document by the reader. However, such visualizations may be presented as bitmap and vector graphics. Bitmap and vector graphics may provide colorful information without providing the underlying numbers or texts used to create the visualization (e.g., the information represented in a chart, graph, or diagram). Furthermore, visualizations presented as bitmap and vector graphics may not be modified by adding, removing, or changing the content used to generate the visualization since these values may not be available from bitmap data. Instead the information used to generate the visualization may need to be determined from the image and then the image may need to be re-drawn in order to modify the visualization. Another disadvantage of bitmap and vector graphics is that they may not allow the content in the visualization to be accurately searched. Another disadvantage of bitmap and vector graphics is that they may not allow for analysis and transformations to be performed on the content.

For instance, certain word processing software documents may be written in XML language and are machine readable. However, inside the XML document, the content may be expressed with unstructured text such that the structure of XML does not reflect the meaning of the content. That is, the content is not machine readable.

Certain slideshow/presentation software documents may show content in structured visualizations, such as a table or diagram, which can be understood by users. However, the content stored inside the document may reflect the visualizations and may not reflect the structure of content such that the content is not machine readable.

Certain spreadsheet software documents may store structured data and show structured data but may only support only one type of structure, which is table. There are many types of general structured data other than table, such as hierarchy, JSON, set, class, control flow, mathematics formula, Resource Description Framework (RDF) schema, UML diagram, etc. Prior spreadsheet software application may not be capable of handling other stores of structured data besides tables.

The XML language supports some types of structured data. However, many other types of structured data are not supported. And for the supported structured data, without knowing the exact structure type, the XML parsing engine may only be able to present it with general representations which might not reflect the nature of the structure. For example, the same data may be represented as a table, a tree, a workflow, as relations, etc. Without knowing the type, the XML parsing engine may not be able to generate diagrams, navigate diagrams, or optimize the diagrams.

The present disclosure addresses these issues by providing techniques for generating, modifying, and presenting computer readable documents including structured data content for visualizing a structure with a plurality of structure elements and a plurality of relationships between the plurality of structure elements. The document includes the structured data content, a data type indicator, and a structure type indicator. The data type indicator is used to determine a parsing algorithm, The parsing algorithm and the structure type indicator are used to parse the structured data content to determine the structure elements and the relationships between the structure elements. The lexical structure of the structured data content reflects the relationships between the structure elements. A visualization of the structure can be automatically generated. The visualization can be linked to or embedded within visualizations of other structures.

The lexical structure of the structured data content may directly reflect the elements and relationships between the elements in the visualization. As such, the structure of the visualization is easy to modify and re-generate. For instance, a user can define a new element and its relationship to existing elements in a structure and the visualization can be automatically generated to show to modified structure. In addition, the structure data document enables several structures to be linked together according to a different structure (e.g., charts can be linked together in a table or list). Furthermore, the user may interact with the visualization to customize the information presented. Techniques for generating structured data documents and visualizations of structured data content are described in further detail below.

FIG. 1 shows a diagram 100 of a server 101 and a client 105, according to an embodiment. The server 101 may be a web server, a cloud-based platform, or a system of multiple computers, for example. The server 101 may provide a server application 102 configured to process requests from the client 105. The server 101 also includes storage 103 for storing document files. The request processing and document handling provided by the server 101 are further described below with respect to FIG. 2.

The client 105 may be a personal computer, a laptop, a smart phone, or a tablet, for example. The client 105 may connect and communicate with the sever 101 through a network, such as the Internet 104. The client 105 provides a web browser 106. The client 105 further provides a client application 107 running on the web browser 106. The client application 107 may be configured to parse structured data content and generate visualizations based on the structured data content as further described below with respect to FIG. 3.

Figure 2:
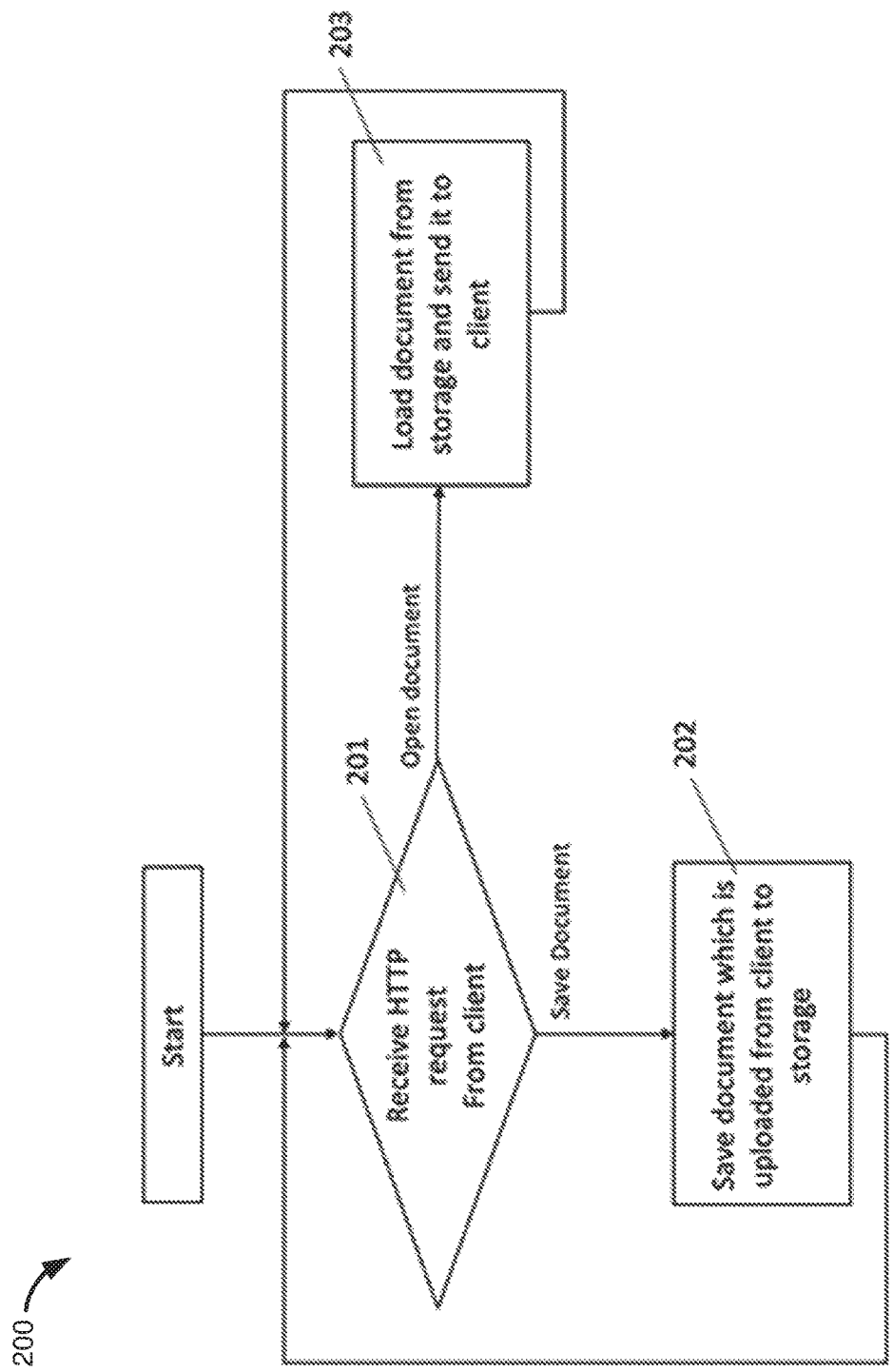
FIG. 2 shows a server-side structured data document handling process diagram, according to an embodiment.

FIG. 2 shows a server-side structured data document handling process diagram 200, according to an embodiment. The process of FIG. 2 may be performed by the server application 102 of the server 101 described above with respect to FIG. 1, for example. The server application 102 may provide an application programming interfaces (APIs) for manipulating documents. The APIs may be triggered by HyperText Transfer Protocol (HTTP) requests from clients, for example.

At 201, the server application receives an HTTP request from a client application (e.g., the client application 107 of the client 105 of FIG. 1). The request may be received over the Internet, for example. If the request indicates to open a particular document, the server application continues at 203.

At 203, the server application loads the document from the storage (e.g., storage 103 of FIG. 1) and sends the document to the client application. If the request received at 201 indicates to save a document, the process continues at 202. At 202, the server application saves the document to the server storage. The document may be uploaded from the client application to the storage. The server application may further perform user authentication, authorization, document search, and content analysis.

Figure 3:
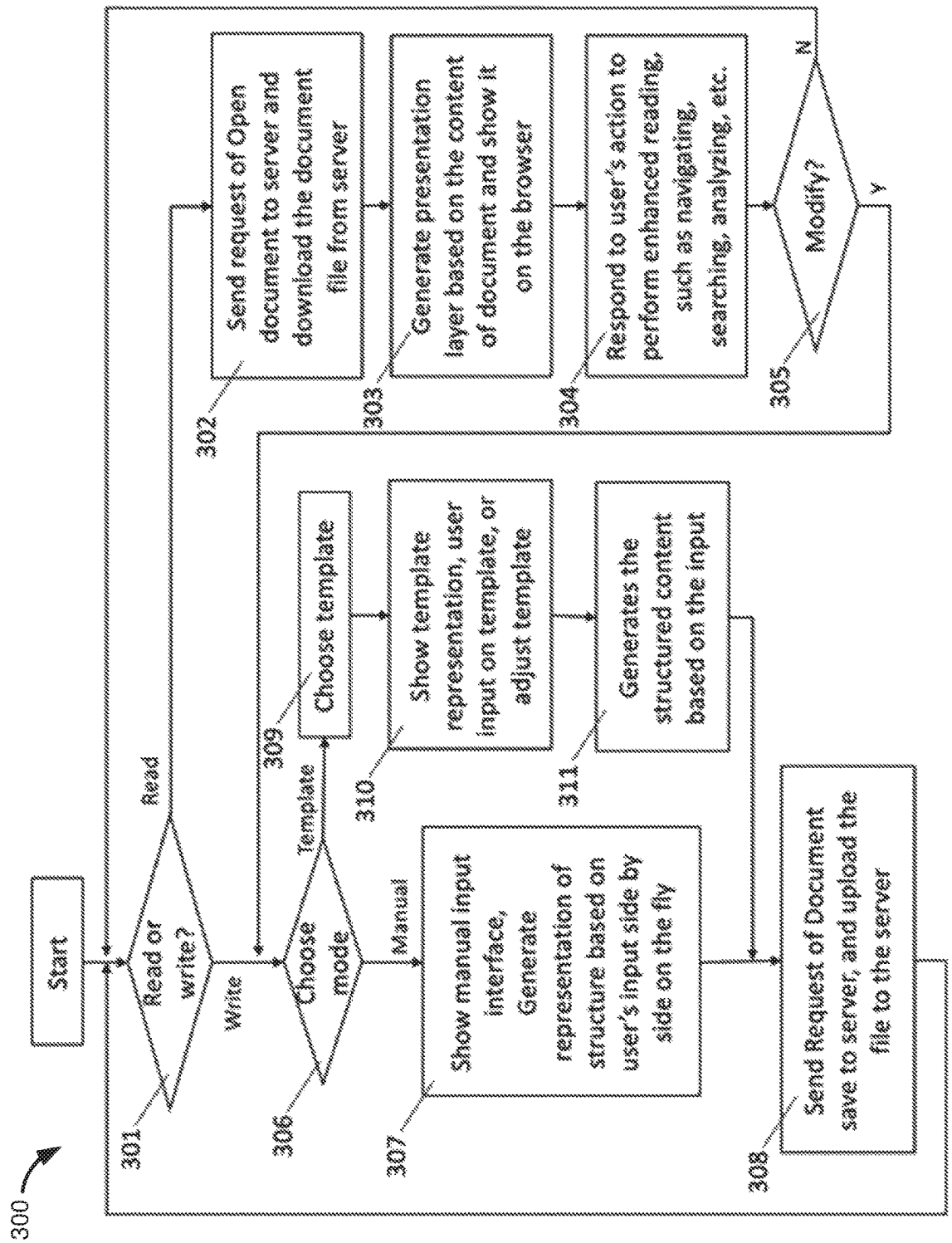
FIG. 3 shows a client-side structured data document handling process diagram, according to an embodiment.

FIG. 3 shows a client-side structured data document handling process diagram 300, according to an embodiment. The process of FIG. 3 may be performed by the client application 107 of FIG. 1, for example. In some embodiments, the client application may be a JavaScript programs downloaded from a web page provided by the web server and the client application may run on a web browser. The client application may provide for document manipulation as described below.

At step 301, the user may choose to Read or Write. If "Write" is chosen, the client application may provide a user interface for the user to choose a mode at 306. The modes available for choosing may be "Manual" or "Template," for example. If the user selects "Manual" mode, the client application continues at 307. At 307, the client application displays a window for user to input structured data content in plain text. Several examples of structured data content in plain text are given below. The client application may read the structured data content and generate a visualization based on the data type, structure type and presentation type on the fly. The client application may generate the visualization as a Scalable Vector Graphics (SVG) image element in HyperText Markup Language (HTML), for example. In some embodiments, the client application running on the web browser may show the visualization such as diagram side by side with the structured data content in plain text.

If the user selects "Template" at 306, the process continues at 309. At 309, the user then can choose an existing document or choose a representation template from among a list presented in the user interface. Each template may be based on a structure type and example structured data. For example, the user may select a tree structure template having three example nodes in the tree. After the template is selected, at 310 a visualization is generated based on the structured data. The system may describe the visualization in an SVG image element in HTML code, for example. The web browser of the client may display the visualization. In some embodiments, related event handlers may be attached to the visualization, enabling the user to edit and adjust the visualization.

At 311 the user may make a change to the visualization and the client application may make corresponding changes to the underlying structured data content. In some embodiments, the structured data content may be enclosed in an XML element. In either Manual or Template mode, after editing of the document is finished, at 308 the client application sends a document save request to the server application and uploads the document to be saved on the storage at the server.

If "Read" is selected at 301, then at 302 the client application sends a request to open a document to the server and then downloads the document file from serve. At 303, the client application reads the structured data content of the document and generates a visualization based on a data type indicator, a structure type indicator, a presentation type indicator, and links included in the document. The client application may define the visualization as an SVG image element in HTML code, for example. The web browser of the client may display the visualization. The visualization may be a diagram, graph, or chart, for example. The client application may define related event handlers that are attached to the visualization to enable user interactions with the visualization. At 304, the client application may receive a user input and trigger the event handlers to manipulate the document, such as navigating the visualization or document, searching the visualization or document, or performing analysis of the visualization, for example. At 305, the user of the client application may "Modify" in the user interface. In response, the client application may continue at 306 to edit the document in either Manual mode or Template mode, as described above.

Systems and methods for parsing a document including structured data content, determining a structure from the content, and generating a visualization of the structure are further described below.

Figure 4:
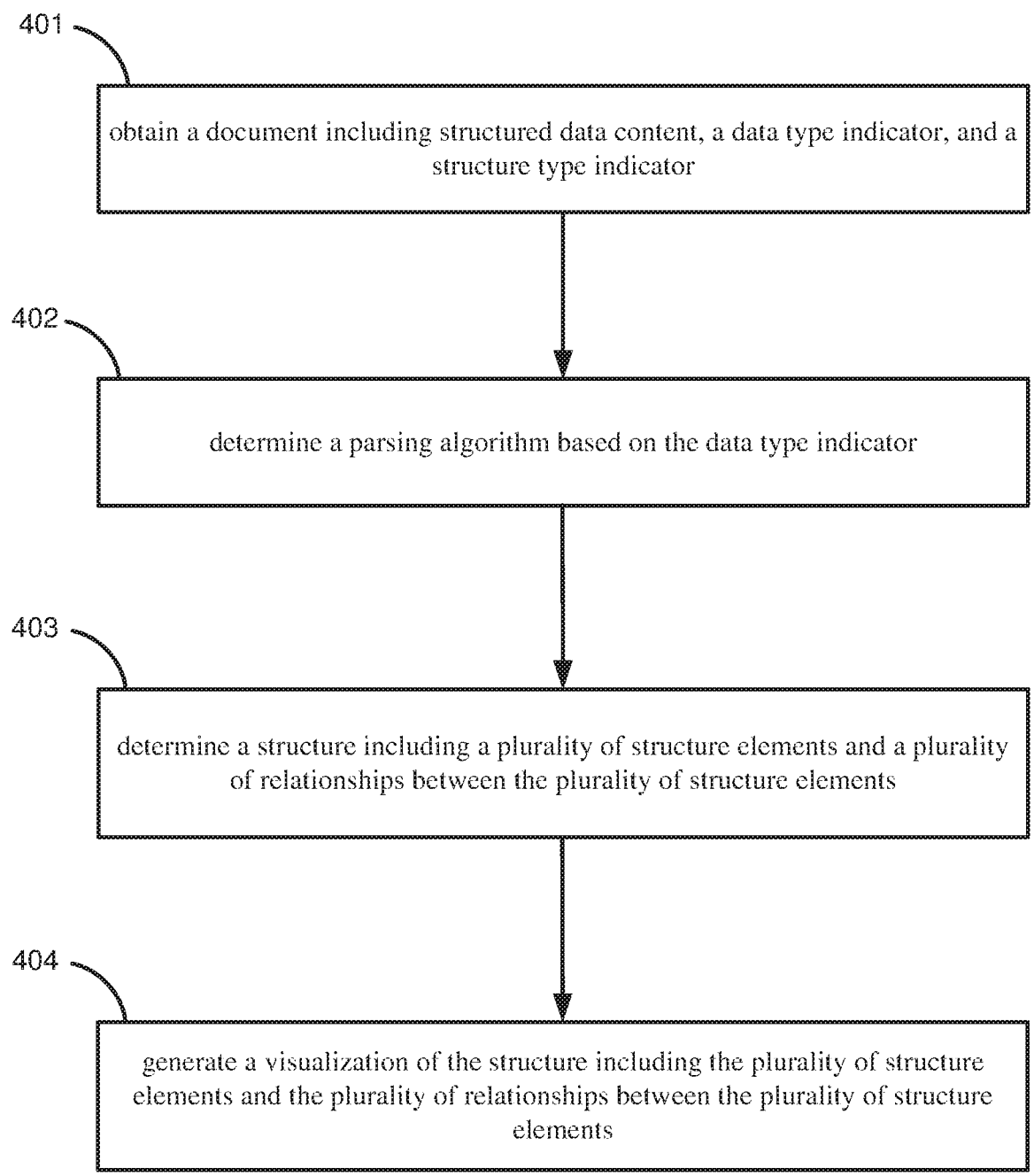
FIG. 4 shows a flow chart of a method, according to an embodiment.

FIG. 4 shows a flow chart 400 of a method, according to an embodiment. The method may be performed by the client application of the client described here.

At 401, obtain a document including structured data content, a data type indicator, and a structure type indicator. The document may be obtained from the server over a network, such as the Internet, as discussed above. The document may include one or more document elements including structured data content. The document elements may XML elements, in some embodiments.

The data type indicator may indicate the type or format of the structured data content. The structured data content may be in JSON format, comma separated variable (CSV) format, or XML format, for example. The data type indicator may be an attribute of an XML element, for example. The structure type indicator may indicate the type of structure represented by the structured data content. For example, the structure may be a tree diagram, a relation diagram, a state chart, a control flow diagram, or any other type of diagram, chart, or graph. Different data types may be used for the same structure type. The document may also include a presentation type indicator. The presentation type indicator indicates how the structure should be visualized. For example, the presentation type indicator may indicate a tree diagram or a bar chart. The structure type and the presentation type may be different. For example, the structure type may indicate a table structure and the presentation type may indicate a bar chart. Certain document elements in the document may include links to other document elements. As such, visualizations can be shown together or embedded within each other, based on the links.

At 402, determine a parsing algorithm based on the data type indicator. The parsing algorithm may be determined from among a plurality of parsing algorithms for different data types. For example, a first parsing algorithm may be used to parse JSON type structured data content and a second parsing algorithm may be used to parse "nested parentheses" type structured data content.

At 403, determine a structure including a plurality of structure elements and a plurality of relationships between the plurality of structure elements. The structure may be determined by parsing the structured data content using the parsing algorithm and the structure type indicator. As further described below, the structure or format of the structured data content may reflect the elements and relationships of the structure to be visualized. For example, the structured data content may include a plurality of structure element values (e.g., names of structure elements) and a plurality of delimiters (e.g., symbols or characters), where the lexical structure of the plurality of delimiters with respect to the plurality of structure element values reflects the plurality of relationships between the plurality of structure elements. Examples are provided in the Listings below.

At 404, generate a visualization of the structure including the plurality of structure elements and the plurality of relationships between the plurality of structure elements. The visualization may be generated based on a presentation type indicator included in the document. For example, the visualization may be an SVG image element in HTML code that is based on the structured data content. The visualization may include other visualizations of linked or embedded elements defined by other structured data content. User interface event handlers may also be defined and related to the structure type, the presentation type, and any links for user interaction. After generating the visualization, it may be presented in the user interface (e.g., in a web browser). A user may interact with the visualization to trigger the event handlers to manipulate the portions of the document represented by the visualization. For example, the user may navigate the structure, search the structured data, or perform analysis of the structured data.

As described herein, the structured data content may reflect the restructure to be visualized. Accordingly, in some embodiments, the structured data content may comprise a plurality of structure element values and a plurality of delimiters. In such embodiments, a lexical structure of the plurality of delimiters with respect to the plurality of structure element values reflects the plurality of relationships between the plurality of structure elements.

As described herein, the client application may present a template structure to the user that may be modified by the user and the modifications may be reflected in changes to the structured data content. Accordingly, in some embodiments, the method may further present the visualization of the structure in a user interface. The method may further determine one or more inputs to the user interface to add to the visualization of the structure a first structure element and a first relationship between the first structure element and the plurality of structure elements. The method may further modify the structured data content based on the data type indicator, the structure type indicator, and the one or more inputs to obtain modified structured data content. The method may further determine a modified structure including the plurality of structure elements, the first structure element, the plurality of relationships, and the first relationship by parsing the modified structured data content using the parsing algorithm and the structure type indicator. The method may further generate a second visualization of the modified structure including the plurality of structure elements, the first structure element, the plurality of relationships, and the first relationship.

As described herein, the client application may present a text representation of the structured data to be modified by a user. Accordingly, in some embodiments, the method may present a text representation of the structured data content in a user interface. The method may further determine one or more inputs to the user interface to modify the text representation of the structured data content. The method may further modify the structured data content based on the one or more inputs to obtain modified structured data content. The method may further determine a modified structure by parsing the modified structured data content using the parsing algorithm and the structure type indicator. The method may further generate a third visualization of the modified structure.

As described herein, structured data elements may be linked to other elements such that diagrams of the structured data may be presented together or embedded within one another. Accordingly, in some embodiments, the structure is a first structure, the structured data content is first structured data content, the data type indicator is a first data type indicator, and the structure type indicator is a first structure type indicator. In such embodiments the document may include a first document element comprising the first structured data content, the first data type indicator, the first structure type indicator, and a first link to a second document element. In such embodiments, the document may further include the second document element comprising second structured data content, a second data type indicator, and a second structure type indicator. In such embodiments the method may further determine a second structure including a second plurality of structure elements and second a plurality of relationships between the second plurality of structure elements by parsing the second structured data content using the second structure type indicator. The method may further generate a second visualization of the second structure including the second plurality of structure elements and the second plurality of relationships between the second plurality of structure elements. The generation of the first visualization may be based on the first link to the second document element, and wherein the first visualization includes the second visualization.

As described herein, the client application may define event handlers to enable the user to interact with and modify the diagrams being visualized. Accordingly, in some embodiments the document may further include a presentation type indicator and the generation of the visualization may be based on the presentation type indicator. In such embodiments, the method may further determine user interface event handlers based on the structure type indicator and the presentation type indicator, where the user interface event handlers may be configured to initiate modification of the visualization in response to one or more user interface inputs.

In some embodiments the document is an eXtensible Markup Language (XML) document and wherein the data type indicator indicates that the structured data content is in XML format. In such embodiments, the structured data content may be included as character data in an XML element. In such embodiments the structure type indicator may be an attribute of the XML element, as described herein.

In some embodiments the data type indicator indicates that the structured data content is formatted as eXtensible Markup Language (XML), JavaScript Object Notation (JSON), comma separated values (CSV) format, or nested parenthesis format.

In some embodiments, the structure type indicator indicates that the structure is a tree diagram, a relation diagram, a control flow diagram, a logic reasoning diagram, or a state chart, as further described below.

Examples of structured data content and the visualizations of structured data content are further described below with respect to FIGS. 5-16.

In some embodiments, the document may be an XML document or file. In some embodiments the structured data content may also be in XML format. In some embodiments the structured data content may be formatted as a different data type, indicating by the data type indicated, but may be included in an XML element of an XML document. In some embodiments the structured data content may be formatted as character data in an XML element, as further described below. In some embodiments, different types of structured data content may be included in different elements of the same XML document. In some embodiments the document is in a different format.

The content of an element can be embedded within the element or in a separate file. The attribute "src" may specify the file name. For example, when the data_type is "CSV," the csv data can be stored in a separate csv file.

Many types of structured data can be expressed in XML format. Generally, an XML document includes both markup and content, which may be differentiated using syntactic rules. Certain characters may define as delimiters (e.g., specific symbols or characters) that separate portions of markup or portions of content. For instance, an XML tag may begin with a left angle bracket (<) and may end with a right angle bracket (>). In XML, strings of characters that are not markup may be considered as content.

In addition, XML documents may include character data sections (CDATA) delimited by a specific sequence of characters and symbols. For instance, XML character data may being with the following delimiter sequence: left angle bracket (<), exclamation point (!), left square bracket ([), capital C (C), capital D (D), capital A (A), capital T (T), capital A (A), and a left square bracket ([) (i.e., <![CDATA[). The character data text may follow the opening delimiter sequence above and the character data may end with the delimiter sequence: right square bracket (]), right square bracket (]), and right angle bracket (>) (i.e.,]]>).

In some embodiments, the structured data content may be included in a character data portion of an XML element. In some embodiments the structured data content may not be in XML format but may be in a different format indicated by the data type indicator.

The structured data content may include a plurality of elements representing a restricted. These elements may be values or names (e.g., names of nodes within a chart). The elements of the structured data content may be separated by one or more characters or symbols that are defined as delimiters. There may be more than one delimiter and more than one type of delimiter. A lexical structure of the plurality of delimiters with respect to the plurality of structure element values reflects the plurality of relationships between the plurality of structure elements. That is, the particular sequence of delimiters separating certain values reflects the relationships between the elements in the structure. Accordingly, the content may be referred to as "structured data." Examples of structured data content and corresponding visualized structured are described below.

Figure 5:
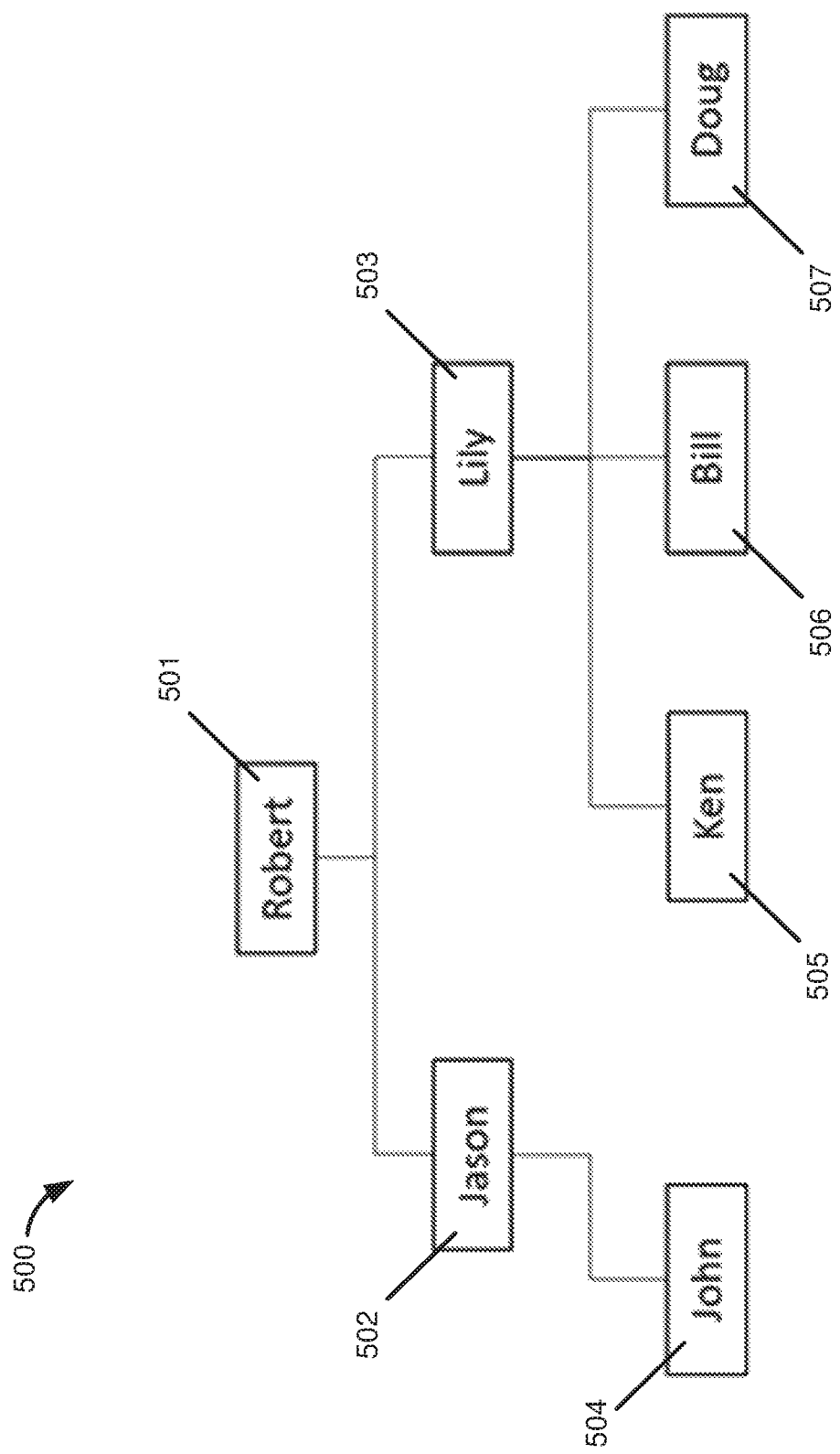
FIG. 5 shows a tree diagram that can be generated using structured data, according to an embodiment.

FIG. 5 shows a tree diagram 500 that can be generated using structured data, according to an embodiment. The tree diagram 500 includes a root node 501 labeled "Robert." The tree diagram may represent a Robert's family tree. As shown in FIG. 5, Jason 502 and Lily 503 are children of Jason 501; John 504 is a child of Jason 502; and Ken 505, Bill 506, and Doug 507 are children of Lily 503. Jason 502 and Lily 503, being on the same level of the tree, are siblings. That is, the relationship between the nodes for Jason 502 and Lily 503 is a sibling relationship. The relationship between the node for Jason 502 and the root node for Robert 501 is a child relationship. The relationship between the root node for Robert 501 and the node for Jason 502 is a parent relationship. The structured data content may reflect the structure and relationships between the nodes as further described below.

The structured data content defining the tree 500 may be included in an XML document. In an XML document, each type of structured data may be enclosed in an XML element. Certain element attributes may be used to indicate the characteristics of the enclosed structured data content. A "data_type" attribute may indicate a data format which the structured data content is stored in the XML element, for example. A "structure_type" attribute may indicate the structure type which the structured data content represents, for example. A "presentation_type" attribute may indicate the presentation style of the structured data content when generating the visualization, for example.

In one example, the tree diagram 500 of FIG. 5 may be expressed as structured data in XML format as shown in Listing 1 below:

---
Listing 1
---

```
<organization structure_type="Tree"
  presentation_type="Tree_diagram">
    <level1 member="Robert">
      <level2 member="Jason">
        <level3 member="John" />
      </level2>
      <level2 member="Lily">
        <level3 member="Ken" />
        <level3 member="Bill" />
        <level3 member="Doug" />
      </level2>
    </level1>
</organization>
```

As shown in Listing 1, the format of the structured data reflects the tree diagram 500 shown in FIG. 5.

The tree diagram 500 may be represented by other types of structured data. For example, structured data content may be expressed in a "nested parentheses" format within a character data portion of an XML element, as shown in Listing 2 below:

---
Listing 2
---

```
<organization data_type="nested_parentheses"
  structured type="Tree" presentation_type="Tree_diagram">
    <![CDATA[Robert(Jason(John),Lily(Ken,Bill,Doug))]]>
</organization>
```

In this example, the character data (CDATA) is used and the structured data content is embedded within the CDATA section, which starts with (<![CDATA[) and ends with (]]>). In this example, the structured data content (Robert(Jason (John),Lily(Ken,Bill,Doug))) is enclosed in CDATA. The format of the nested parenthesis reflects the tree diagram 500 shown in FIG. 5. In this format, a sequence of alphanumeric characters may be designated as a "value" or "name" and the left parenthesis (( ) right parenthesis ( )), and comma symbols (,) may be used as delimiters. A parsing algorithm may be configured to distinguish between the "values" and the "delimiters." The parsing algorithm may also be configured to determine a relationship between the values based on a sequence of delimiters between the values. Different parsing algorithms may be defined for different data types and for different structure types.

For example, "Robert" is the first sequence of alphanumeric characters listed in the structured data content shown in Listing 2 above (e.g., Robert comes immediately after left square bracket symbol designating the end of the CDATA opening delimiter sequence). Accordingly, "Robert" is the root node 501 of the tree 500. A child relationship may be determined based on "Jason" being separated from another value by one left parenthesis (( ) any number of comma symbols (,), and any number of pairs of left parenthesis (( )

and right parenthesis ( )) with any characters or symbols in between the pairs of parenthesis. For example, "Jason" has a child relationship to "Robert" because they are separated by one left parenthesis (( ), "Lily" also has a relationship to "Robert" because Lily is separated from "Robert" by one left parenthesis, one pair of left and right parentheses (e.g., the pair enclosing "John") and one comma symbol (e.g., the comma immediately before "Lily"). Furthermore, the sibling relationship between "Jason" and "Lily" may be defined by these values being separated by any number of comma symbols and another number of pairs of left and right parenthesis. Thus, the relationships shown in the tree diagram 500 reflect the particular structure of the values and the delimiters in the structured data content.

When viewing the document, the client application may parse the structured data content (e.g., the text in a character data portion of XML) based on the data type indicator and structure type indicator. Accordingly, the parsing algorithm determines the relationships between the values/names and the client application can generate the tree diagram 500 visualization, which can then be displayed on a user's screen.

As mentioned above, different types of diagrams can be visualized using structured data.

Figure 6:
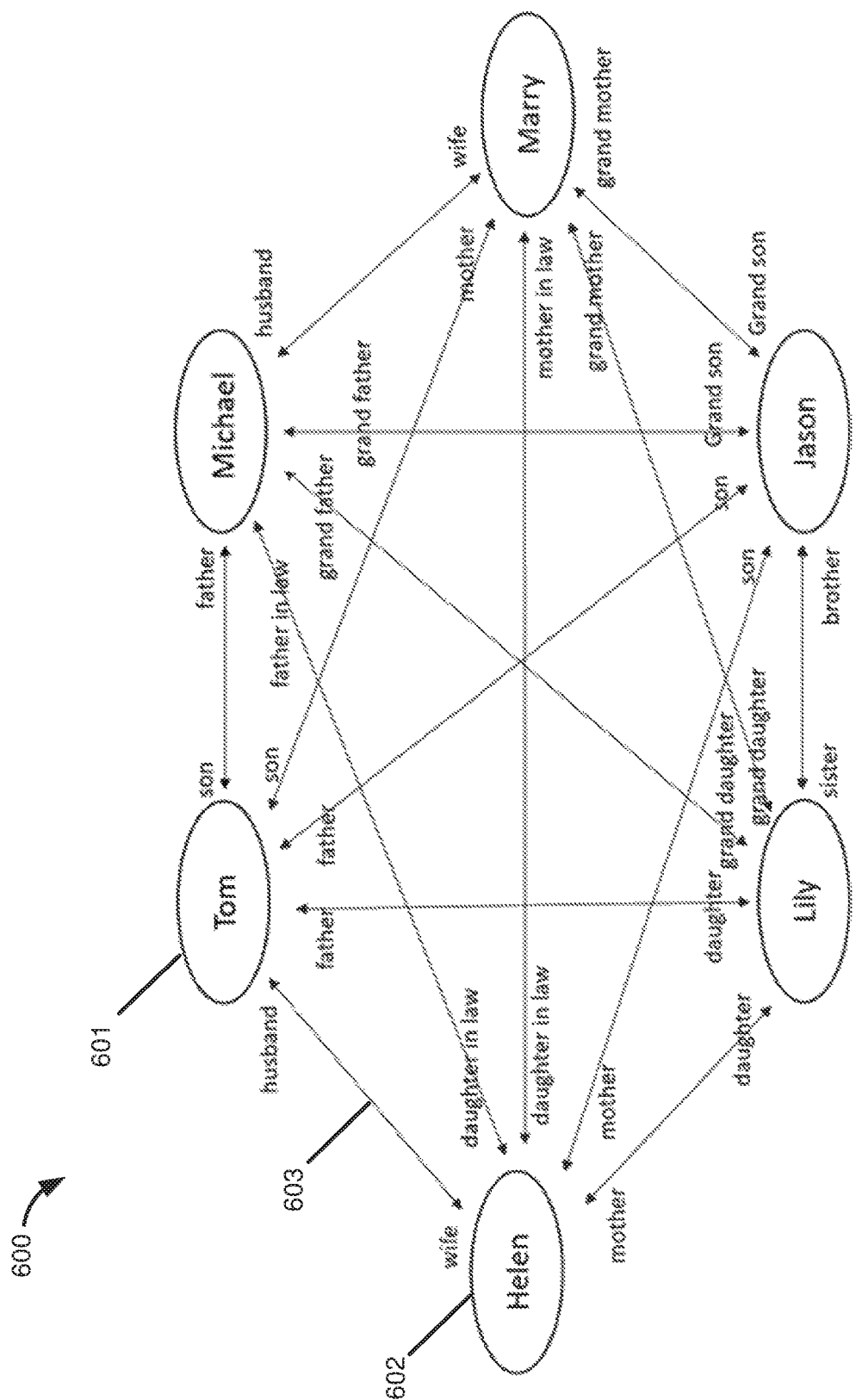
FIG. 6 shows a relationship diagram that can be generated using structured data, according to an embodiment.

FIG. 6 shows a relationship diagram 600 that can be generated using structured data, according to an embodiment. As shown in the relationship diagram 600 of FIG. 6, "Tom" 601 is husband to "Helen" 602 and "Helen" 602 is wife to "Tom" 601. The relationship is shown by the double-sided arrow 603 labeled with "wife" and "husband."

The structured data content used to generate the relationship diagram structure can be expressed in different structured data formats. Therefore, the relationship 603 between the element 601 for "Tom" and the element 602 for "Helen" can be expressed different according to different structured data types. For example, the relationship diagram structure can be expressed in XML format as shown in Listing 3 below:

Listing 3

```
<family data_type="XML" structure_type="Relation" presentation_type="Relation_diagram">
    <relation>
        <memberA>Helen</memberA><memberB>Tom</memberB><BToA>husband</BToA><AToB>wife</AToB>
    </relation>
    <relation>
        <memberA>Tom</memberA><memberB>Michael</memberB><BToA>father</BToA><AToB>son</AToB>
    </relation>
    <relation>
        <memberA>Tom</memberA><memberB>Lily</memberB><BToA>daughter</BToA><AToB>father</AToB>
    </relation>
    <relation>
        <memberA>Tom</memberA><memberB>Jason</memberB><BToA>son</BToA><AToB>father</AToB>
    </relation>
    <relation>
        <memberA>Tom</memberA><memberB>Marry</memberB><BToA>Mother</BToA><AToB>son</AToB>
    </relation>
    <relation>
        <memberA>Helen</memberA><memberB>Lily</memberB><BToA>daughter</BToA><AToB>mother</AToB>
    </relation>
    <relation>
        <memberA>Helen</memberA><memberB>Jason</memberB><BToA>son</BToA><AToB>mother</AToB>
    </relation>
    <relation>
        <memberA>Helen</memberA><memberB>Machael</memberB><BToA>father_in_law</BToA><AToB>daughter_in_law</AToB>
    </relation>
    <relation>
        <memberA>Helen</memberA><memberB>Marry</memberB><BToA>mother_in_law</BToA><AToB>daughter_in_law</AToB>
    </relation>
    <relation>
        <memberA>Lily</memberA><memberB>Jason</memberB><BToA>brother</BToA><AToB>sister</AToB>
    </relation>
    <relation>
        <memberA>Lily</memberA><memberB>Michael</memberB><BToA>grand father</BToA><AToB>grand daughter</AToB>
    </relation>
    <relation>
        <memberA>Lily</memberA><memberB>Marry</memberB><BToA>grand mother</BToA><AToB>grand daughter</AToB>
    </relation>
    <relation>
        <memberA>Jason</memberA><memberB>Michael</memberB><BToA>grand father</BToA><AToB>grand son</AToB>
    </relation>
```

-continued

Listing 3

```
<relation>
<memberA>Jason</memberA><memberB>Marry</memberB><BToA>grand mother</BToA><AToB>grand son</AToB>
</relation>
<relation>
<memberA>Michael</memberA><memberB>Marry</memberB><BToA>wife</BToA><AToB>husband</AToB>
</relation>
</family>
```

As another example, the same structure of the relationship diagram 600 shown in FIG. 6 can be represented by structured data content in the CSV format, as shown in Listing 4 below:

Listing 4

```
<family data_type="CSV" structure_type="Relation" presentation_type="Relation_diagram">
<![CDATA[memberA,memberB,BToA,AtoB
Helen,Tom,husband,wife
Tom,Michael,father,son
Tom,Lily,daughter,father
Tom,Jason,son,father
Tom,Marry,Mother,son
Helen,Lily,daughter,mother
Helen,Jason,son,mother
Helen,Machael,father_in_law,daughter_in_law
Helen,Marry,mother_in_law,daughter_in_law
Lily,Jason,brother,sister
Lily,Michael,grand father,grand daughter
Lily,Marry,grand mother,grand daughter
Jason,Michael,grand father,grand son
Jason,Marry,grand mother,grand son
Michael,Marry,wife,husband]]>
</family>
```

As a third example, the same relationship structure visualized as the relationship diagram 600 can be expressed with JSON format, as shown in Listing 5 below:

Listing 5

```
<family data_type="JSON" structure_type="Relation" presentation_type="Relation_diagram">
<![CDATA[
[{"memberA":"Helen","memberB":"Tom","BToA":"husband","AToB":"wife"},
{"memberA":"Tom","memberB":"Michael","BToA":"father","AToB":"son"},
{"memberA":"Tom","memberB":"Lily","BToA":"daughter","AToB":"father"},
{"memberA":"Tom","memberB":"Jason","BToA":"son","AToB":"father"},
{"memberA":"Tom","memberB":"Marry","BToA":"Mother","AToB":"son"},
{"memberA":"Helen","memberB":"Lily","BToA":"daughter","AToB":"mother"},
{"memberA":"Helen","memberB":"Jason","BToA":"son","AToB":"mother"},
{"memberA":"Helen","memberB":"Machael","BToA":"father_in_law","AToB":"daughter_in_law"},
{"memberA":"Helen","memberB":"Marry","BToA":"mother_in_law","AToB":"daughter_in_law"},
{"memberA":"Lily","memberB":"Jason","BToA":"brother","AToB":"sister"},
{"memberA":"Lily","memberB":"Michael","BToA":"grand father","AToB":"grand daughter"},
{"memberA":"Lily","memberB":"Marry","BToA":"grand mother","AToB":"grand daughter"},
{"memberA":"Jason","memberB":"Michael","BToA":"grand father","AToB":"grand son"},
{"memberA":"Jason"," memberB ":"Marry","BToA":"grand mother","AToB":"grand son"},
{"memberA":"Michael","memberB":"Marry","BToA":"wife","AToB":"husband"}]
]]>
</family>
```

Thus, the same structure can be representing using different structured data types.

In addition, different types of structures can be represented using the same structured data content. For example, the same structured data content may be visualized as a different type of diagram.

FIG. 7 shows a table 700 that can be generated using structured data, according to an embodiment. The table 700 includes the same information shown in the relationship diagram 600 of FIG. 6 but is presented as a different type of diagram. For instance, the cell 701 for "Helen" in FIG. 7 corresponds to the element 602 for "Helen" in FIG. 6 and the cell 702 for "Tom" in FIG. 7 corresponds to the element 601 for "Tom" in FIG. 6. Furthermore, the cell 703 for "husband" and the cell 704 for "wife" in the table 700 correspond to the double-sided relationship arrow 603 for "husband" and "wife" in FIG. 6.

The client application may use the same parsing algorithm when paring the same type of structured data content. However, the relationship diagram 600 may have a different structure type indicator (e.g., structure_type="Relation") compared to the structure type for the table 700 of FIG. 7 (e.g., structure_type="Table"). Therefore, the structures determined by the client application may be different based on the different structure type indicators.

Figure 8:
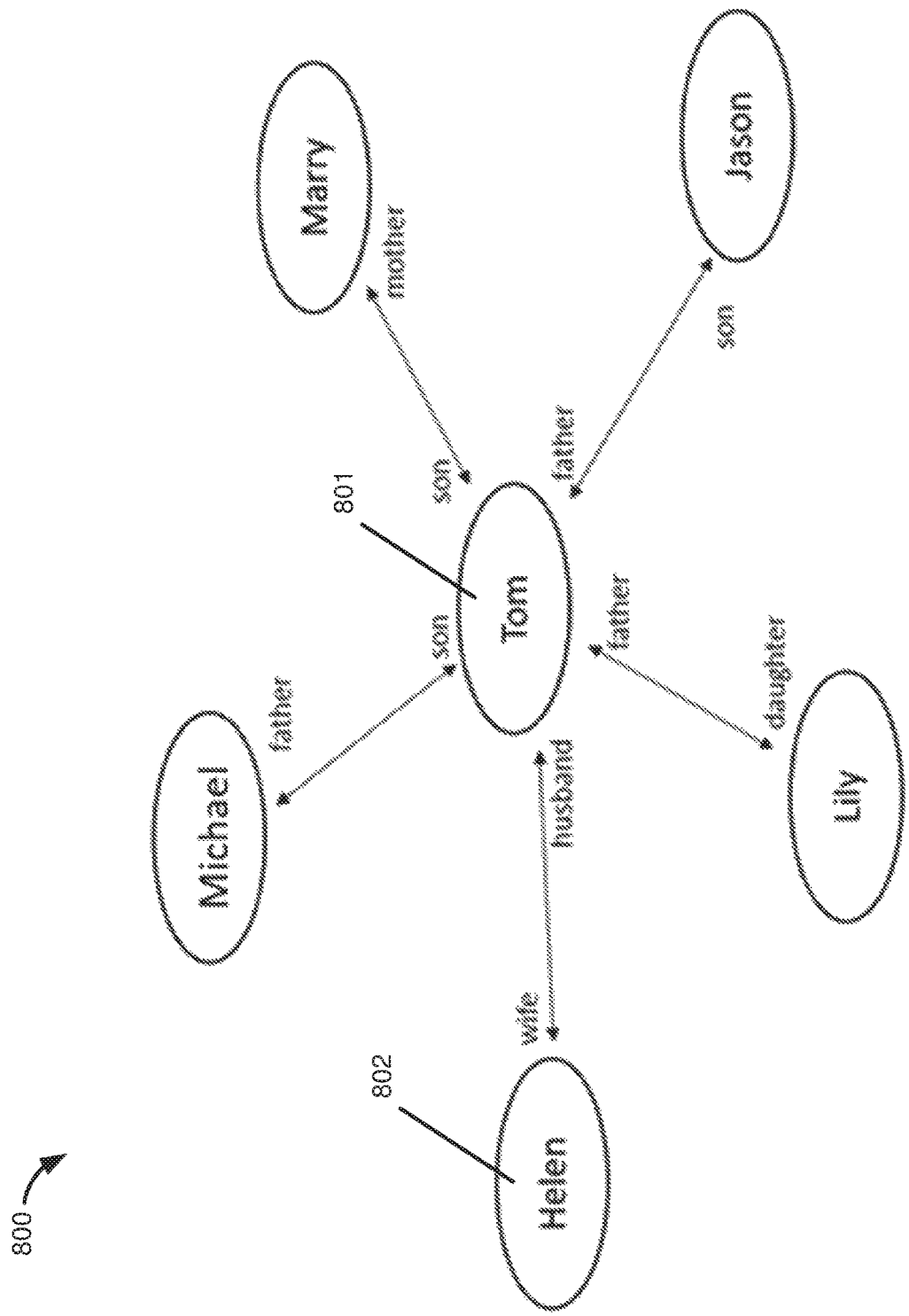
FIG. 8 shows a relationship diagram subset that can be generated using structured data, according to an embodiment.

The client application may be further configured to present the structured data content in different ways. FIG. 8 shows a relationship diagram subset 800 that can be generated using structured data, according to an embodiment. In this example, the document has two layers: a structured data layer and a presentation layer. The presentation layer may define the visualizations displayed in the web browser. The structured data layer may define the machine-readable content in the structured data document. One advantage of using two layers is that the structured data layer is machine readable and reflects the structure of the diagram while the presentation layer can be dynamic, displaying the structured data in response to user interactions.

A user may manipulate on the visualized document according to the nature of the respective structure. For example, when viewing the relation diagram 600 shown in FIG. 6, the user may select the element 601 for "Tom" and the client application may dynamically generate the relationship diagram subset 800 focused on the element 801 for "Tom" shown in FIG. 8. Thus, the user can control the client application to show the relations to one focused member and conceal relations between other members. For instance, the element 802 for "Helen" is shown in FIG. 8 since "Helen" has a direct relationship with "Tom," but other elements of FIG. 6 are not shown in FIG. 8 (e.g., the relationship arrows not connected to "Tom" are not shown). Such dynamic presentation may be advantageous if the original diagram is very large and where the user wants to see only a specific portion of the diagram.

As mentioned above, other types of diagram structures can be visualized using structured data. Visualization of structured data is advantageous because it may be utilized in programming and data analysis. For example, a control flow structure type in computer science can be visualized to show the order in which individual statements, instructions or function calls, of a program are executed or evaluated. This type of structured data can be expressed with programming language, and it can be recognized directly by a computer.

Figure 9:
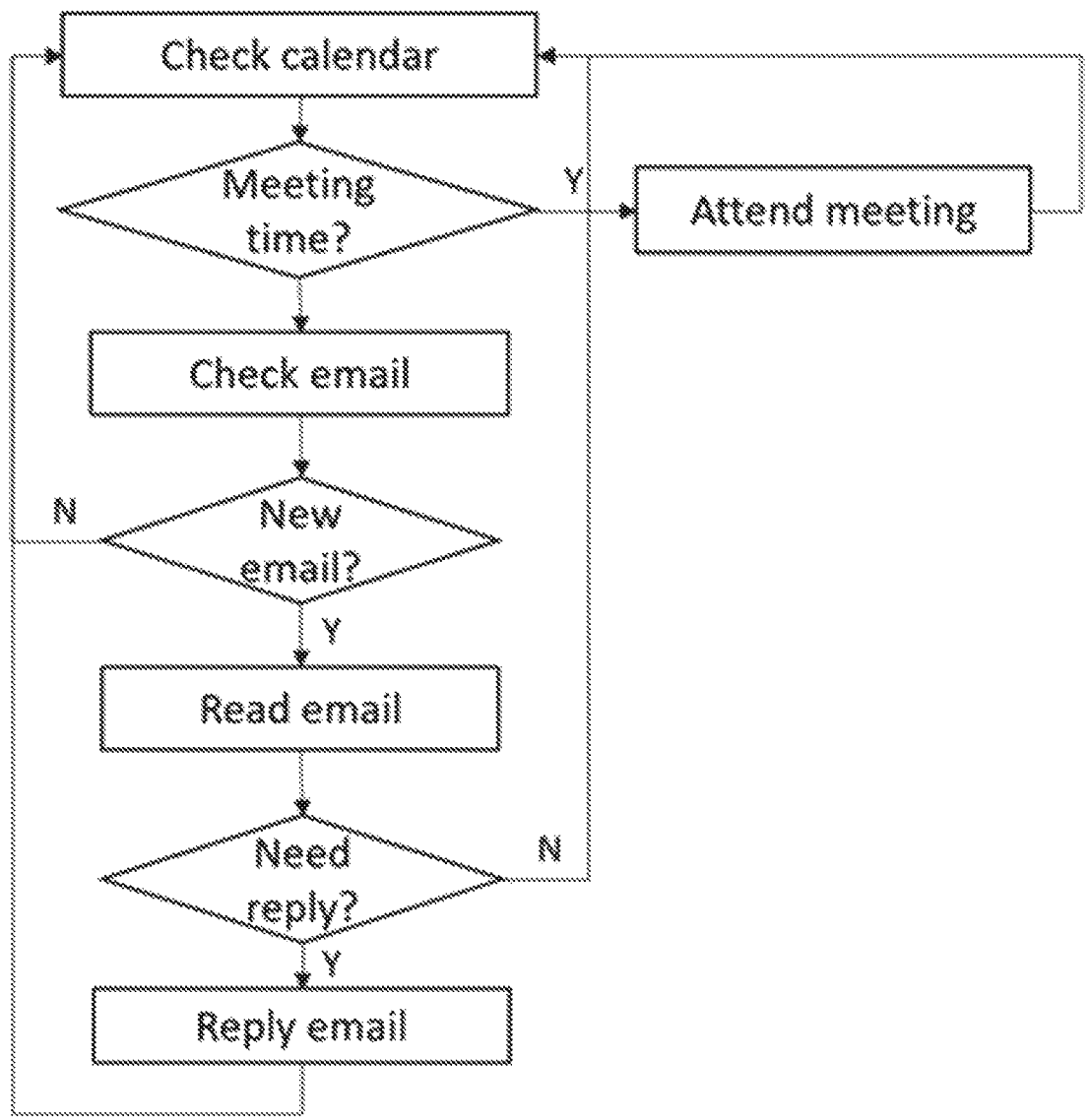
FIG. 9 shows a control flow diagram for a software application that can be generated using structured data, according to an embodiment.

FIG. 9 shows a control flow diagram 900 for a software application that can be generated using structured data, according to an embodiment. Besides benefits for reading, when the content is machine readable, the content can be utilized directly in other areas, such as programming, and data analyzing. This type of structured data content can be enclosed inside an XML element, as shown in Listing 6 below:

---
Listing 6
---

```
<program data_format="Script" structure_type="Control_flow"
presentation_type="Control_flow_diagram">
    <![CDATA[
    #Check_calendar
    Check calendar
    If "Meeting time" Then goto #Attend_Meeting
    Else Check email
    If New emal? Then goto #Read_email
    Else goto #Check calendar
    #Read_email
    Read email
    If Need reply? Then goto #Reply_email
    Else goto #Check_calendar
    #Reply_email
    Reply email
    goto #Check_calendar
    #Attend Meeting
    Attend Meeting
    goto #Check_calendar
    ]]>
</program>
```

The client application, described herein, may read the control flow structured data content, determine the elements and the relationships between the elements, and then generate a visualization of the control flow diagram for presentation in the user interface. Furthermore, as described herein, the user may edit the control flow diagram on the presentation layer and the client application may be configured to modify the underlying structured data content accordingly. That is, the modifications made on the presentation lay may be translated back to script format. Therefore, since the structured data layer is machine readable it can be used to generate code for use in software programing.

Figure 10:
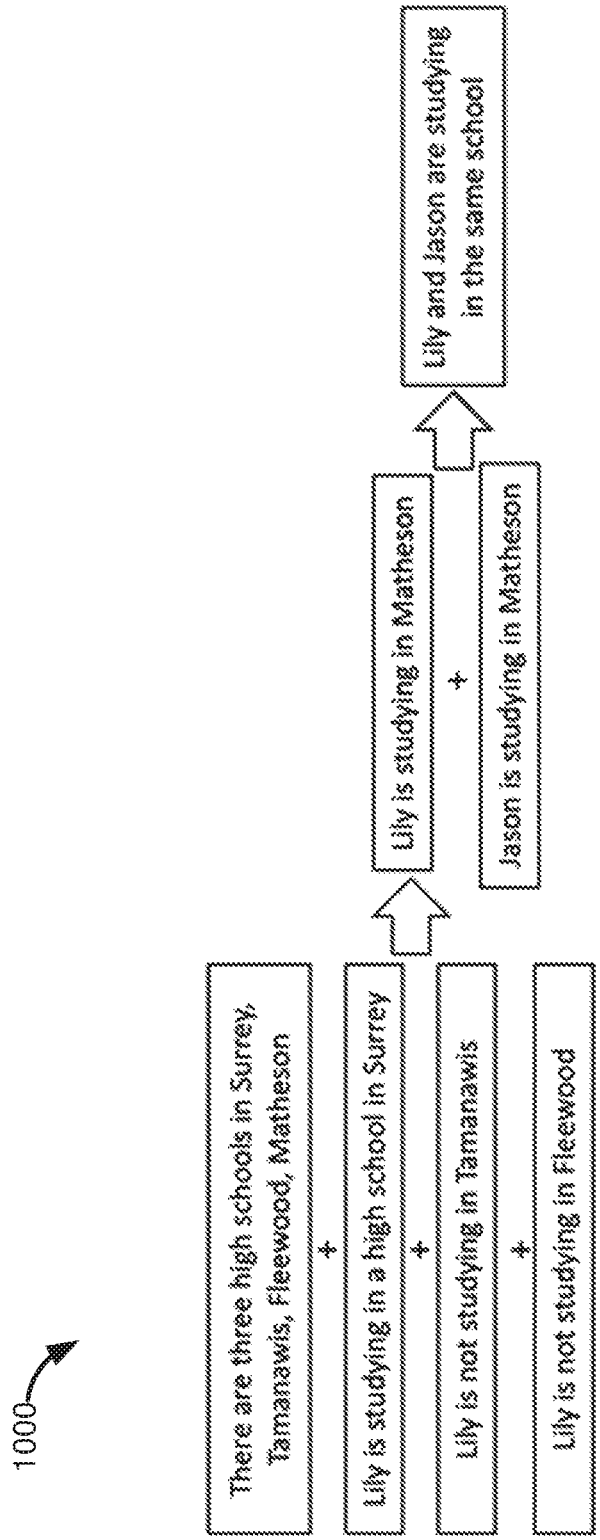
FIG. 10 shows a logical reasoning diagram that can be generated using structured data, according to an embodiment.

Another structure type that may be represented using structured data content is a logical reasoning diagram. FIG. 10 shows a logical reasoning diagram 1000 that can be generated using structured data, according to an embodiment. This type of diagram may be used for understanding logic and reasoning expressed with natural language. The diagram may be more accurate and clearer to present as structured data instead of as natural language.

For example, a logical reasoning process may be described using words in natural (unstructured) language based on the four following pieces of evidence: (1) "There are three high schools in Surrey, Tamanawis, Fleewood, Matheson," (2) "Lily is studying in a high school in Surrey.," (3) "Lily is not studying in Tamanawis.," and (4) "Lily is not studying in Fleewood." From these four pieces of evidence, the following conclusion may be deduced: "Lily is studying in Matheson." In addition, the conclusion "Jason is studying in Matheson" may also be deduced. Accordingly, the conclusion "Lily and Jason are studying in the same school" may be deduced. These statement may be expressed in structured data, as shown in Listing 7 below:

---
Listing 7
---

```
<school data_type="JSON" structure_type="Reasoning "
presentation_type="Reasoning_diagram">
    <![CDATA[
    [evidence:[{" evidence":["There are three high schools in Surrey,
Tamanawis, Fleewood, Matheson. ",
    "Lily is studying in a high school in Surrey. ",
    "Lily is not studying in Tamanawis. ",
    "Lily is not studying in Fleewood. "],
    "conclusion":"Lily is studying in Matheson"},
    "Jason is studying in Matheson. "],
    "conclusion":"Lily and Jason are studying in the same school"}
    ]]>
</school>
```

The client application may parse the structured data content and generate the structured diagram 1000 shown in FIG. 10. For this content, the parsing algorithm may handle the relationships between the evidence and the conclusions. While the evidence and conclusion statement may not necessarily be machine readable, the user's experience in viewing the information in a document may be improved by visualizing such statements as structured data.

Figure 11:
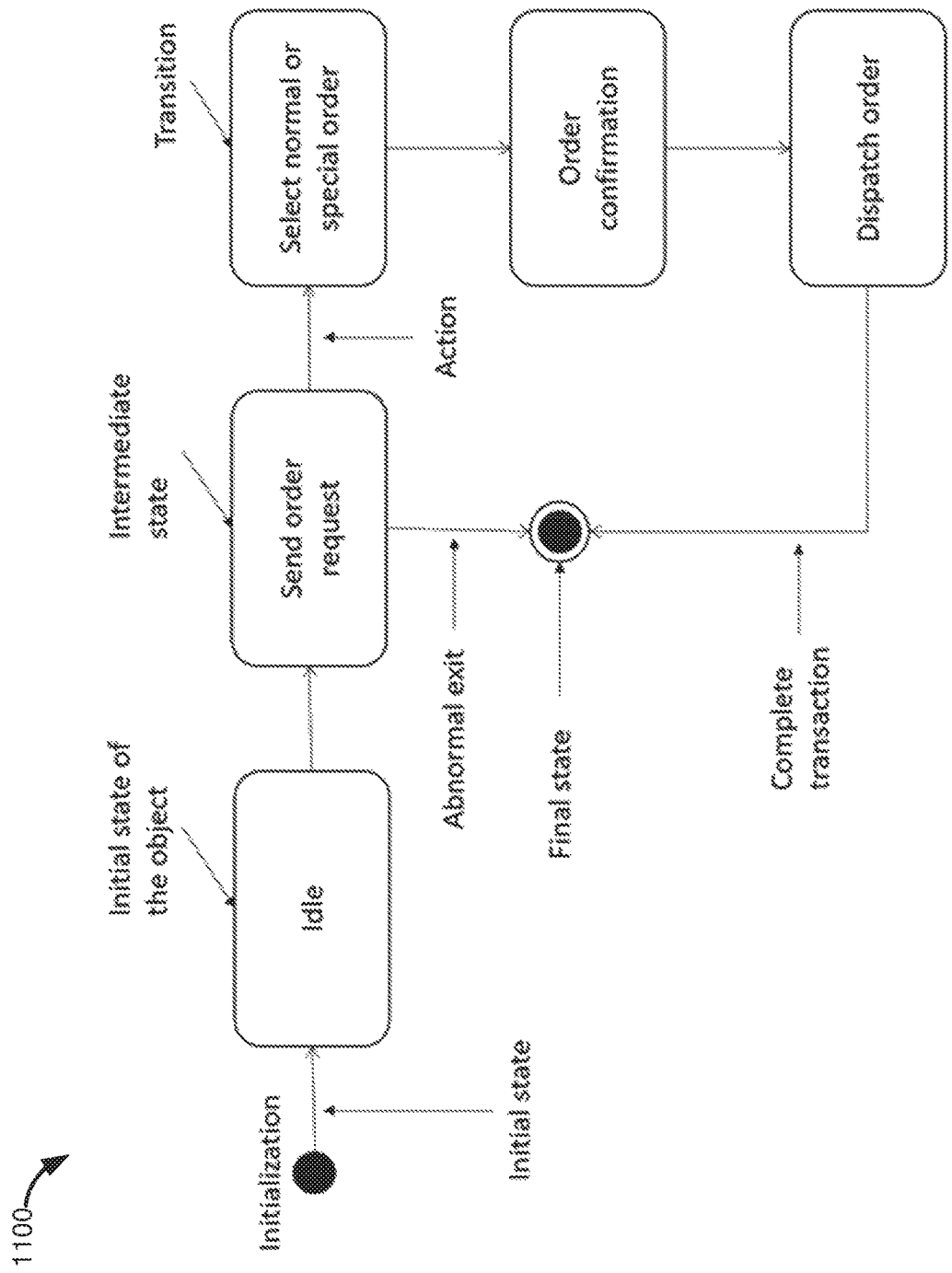
FIG. 11 shows a state chart that can be generated using structured data, according to an embodiment of the invention.

A state chart is another structure type that may be represented using structured data content. FIG. 11 shows a state chart 1100 that can be generated using structured data, according to an embodiment of the invention. Certain types of professional diagrams are based on the Unified Modeling Language (UML). UML is a general-purpose modeling language that is intended to provide a standard way to visualize the design of a system. UML may represent content with diagrams, and it may show many types of diagram to fit many types of content, such as class diagram, object diagram, component diagram, deployment diagram, use case diagram, interaction diagram, state chart diagram, activity diagram, for example. The visualized diagrams may improve a user's comprehension of complex structures. However, UML only defines a diagram format. And UML diagrams may be created as graphic images or bitmap images. While the images may be read by users, they may not be structured so that the values and relationships may be easily determined by a machine.

UML diagrams may be translated into structured data content and such structured data content may be enclosed in an XML element. In addition, the client application may define rules to express UML diagrams as structured data so that the client application can generate the UML diagram based on the structured data.

In one example, the logic for a state chart can be described with JSON format as shown in Listing 8 below:

Listing 8

```
<state_chart data_type="JSON" structure_type="UML_statechart" presentation_type="Statechart_diagram">>
<![CDATA[
{"Idle":{"component_type":"state",
"component_description":"Initial state of the object"},
"Send order request":{"component_type":"state",
"component_description":"Intermediate state"},
"Select normal or special order":{"component_type":"state",
"component_description":"Transition"},
"Order confirmation":{"component_type":"state"},
"Dispatch order":{"component_type":"state"},
"Select normal or special order":{"component_type":"state",
"component_description":"Transition"},
"Initialization":{"component_type":"start point"},
"Final state":{"component_type":"end point"},
"link1":{"component_type":"link",
"from":"start point",
"to":"Initialization",
"component_description":"Initial state"},
"link2":{"component_type":"link",
"from":"Idle",
"to":"Send order request"},
"link3":{"component_type":"link",
"from":"Send order request",
"to":"Select normal or special order",
"component_description":"Action"},
"link4":{"component_type":"link",
"from":" Select normal or special order ",
"to":"Order comfirmation"},
"link5":{"component_type":"link",
"from":"Order comfirmation",
"to":"Dispatch order"},
"link6":{"component_type":"link",
"from":"Dispatch order",
"to":"Final state",
"component_description":"Complete transaction"},
"link7":{"component_type":"link",
"from":"Send order request",
"to":"Final state",
"component_description":"Abnormal exit"}}
]]>
</state_chart>
```

Using the techniques described herein, the client application may parse the structured data, generate a state chart visualization, and present the state chart, as shown in FIG. 11.

Figure 12:
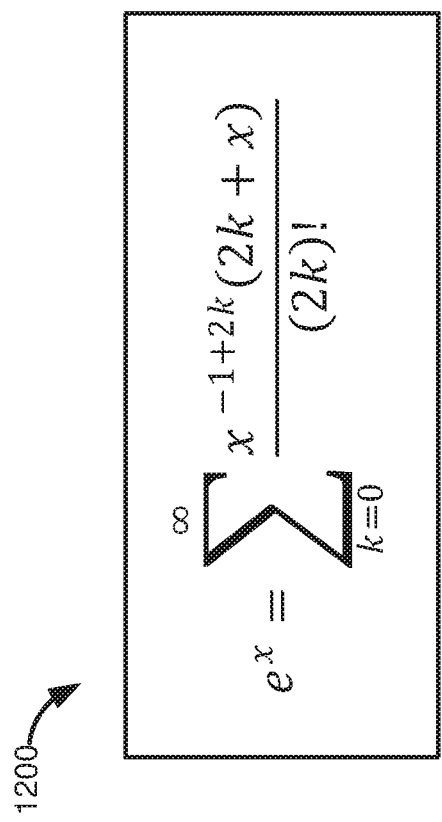
FIG. 12 shows a mathematical formula that can be generated using structured data, according to an embodiment.

Math equations are another structure type that may be represented using structured data content. FIG. 12 shows a mathematical formula 1200 that can be generated using structured data, according to an embodiment. The formula shown in FIG. 12 may be based on the mathematics expression: $E^{\wedge}x = Sum[(x^{\wedge}(-1+2k)(2k+x))/(2k)!, \{k, 0, Infinity\}]$. By representing this expression using structured data, the expression may be both machine readable and human readable. For instance, the machine readable expression is provided by the structured data layer of the document and the visualization generated by the client application is the presentation layer. For this example, the math expression above may be formatted as structured data as shown in Listing 9 below:

Listing 9

```
<formula data_type="script" structured_type="math">
<![CDATA[
E^x = Sum[(x^(-1 + 2 k) (2 k + x))/(2 k)!, {k, 0, Infinity}]
]]>
</formula>
```

Using the techniques described herein, the client application may parse the formula based on rules for mathematics and generates the visualization of the formula in traditional mathematics format, as shown in FIG. 12.

Structured data may also be linked to other structured data. FIG. 13 shows a list 1300 of multiple embedded mathematical formulas that can be generated using structured data, according to an embodiment. That is, three mathematical formula type structures may be embedded in a list type structure. Exemplary structured data in XML format is shown in Listing 10 below:

Listing 10

```
<func structure_type="List" presentation_type="List_diagram" title="Series representations of exponential function" >
<formula data_type="script" structured_type="math" >
<![CDATA[
e^x = sum_(k=0)^∞ x^k/(k!)
]]>
</formula>
<formula data_type="script" structured_type="math" >
<![CDATA[
e^x = sum_(k=-∞)^∞ I_k(x)
]]>
</formula>
<formula data_type="script" structured_type="math" >
<![CDATA[
e^x = sum_(k=0)^∞ (x^(-1 + 2 k) (2 k + x))/((2 k)!)
]]>
</formula>
</func>
```

In some embodiments, the XML elements may specify an attribute "id." As such, the elements may be linked by other elements using the "id" attribute. For example, the formulas may be defined as shown in Listing 11 below:

Listing 11

```
<formula data_type="script" structured_type="math" id="f1">
<![CDATA[
e^x = sum_(k=0)^∞ x^k/(k!)
]]>
</formula>
<formula data_type="script" structured_type="math" id="f2">
<![CDATA[
e^x = sum_(k=-∞)^∞ I_k(x)
]]>
</formula>
<formula data_type="script" structured_type="math" id="f3">
<![CDATA[
e^x = sum_(k=0)^∞ (x^(-1 + 2 k) (2 k + x))/((2 k)!)
]]>
</formula>
```

The ids of these elements are "f1," "f2," and "f3," To embed these elements in another element, the attribute "link" may be used to define the link as shown in Listing 12 below:

Listing 12

```
<func structure_type="List" presentation_type="List_diagram"
title="Series representations of exponential function" >
    <formula link="f1" />
    <formula link="f2" />
    <formula link="f3" />
</func>
```

Thus, the structure can be simplified by using links as shown in Listing 12 such that one element can be shared by many elements. The client application may define various behaviors to handle links. For example, structured data content in the element as shown in Listing 13 below:

Listing 13

```
<formula link="f1" target="nesting">First formula</formula>
```

This content, when visualized, may show the text "First formula" instead of showing the actual math formula. Then, the user may select the "First formula" text and, in response, the client application may generate and shown the first formula nested in the list structure, as shown in FIG. 13. The attribute "target" may control how the linked element is presented. For example, when the "target" is "nesting," the client application may display the linked element inside the current element. When the "target" is "popup," the client application may display the linked element in a popup window. When the "target" is "blank," the client application may display the linked element in a new tab. When the "target" is "self," the client application may erase everything in current window and display the linked element instead.

In some embodiments the data type may not be XML. In such cases links may be created by using keywords. For example, an element may be created to specify the links between the linked elements and related keywords, as shown in Listing 14 below:

Listing 14

```
<links id=func_links>
    <link key="func1">f1</link>
    <link key="func2">f2</link>
    <link key="func3">f3</link>
</links>
```

The keywords "func1," "func2," and "func3" may be defined to link to the ids "f1," "f2," and "f3" respectively in the "func_links" element. To create an element which embeds these three formulas, the structured data content may specify the attribute "links" to point to the "func_links" element, as shown in Listing 15 below:

Listing 15

```
<func data_type="JSON" structure_type="List" links="func_links">
<![CDATA[
{"Series representations of exponential function":[func1, func2, func3 ]}
]]>
</func>
```

Accordingly, the client application may parse the structured data content, generate the diagram 1300 of the list, and for each component of the list the client application may generate the visualization of the mathematical formula and embed it in the list, as shown in FIG. 13.

Figure 14:
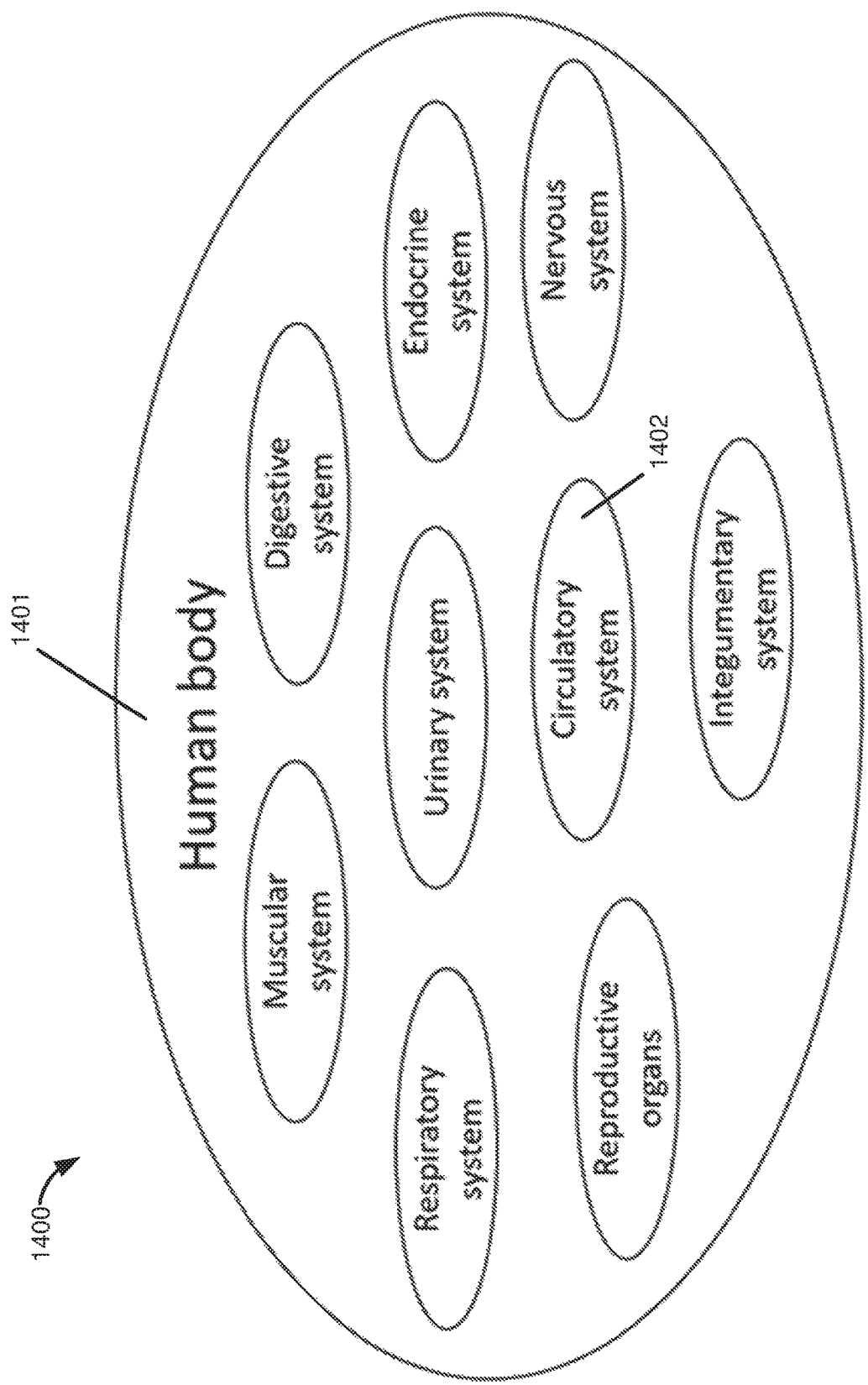
FIG. 14 shows a diagram of elements of human anatomy that can be generated using structured data, according to an embodiment.

Structured data may also be used to embed visualizations in other visualizations. FIG. 14 shows a diagram 1400 of elements of human anatomy that can be generated using structured data, according to an embodiment. The diagram 1400 shows elements of the "human body" 1401, which includes the "circulatory system" 1402. By generating this diagram using structured data the user may be able to navigate to linked elements, such as the "circulator system" 1402. A linked element may be shown in popup window or displayed within the current element, for example. The behavior can be defined using the attributes of the link.

The structured data for the diagram of the "human body" element 1401 is defined as shown in Listing 16 below:

Listing 16

```
<body data_type="JSON" structure_type="list"
presentation_type="Set_view" links="body_links">
    <![CDATA[
    {"Human body":["Muscular system","Digestive system","Respiratory
system","Urinary system","Reproductive organs","Endocrine
system","Circulatory system","Nervous system","Integumentary
system"]}
    ]]>
</body>
```

Figure 15:
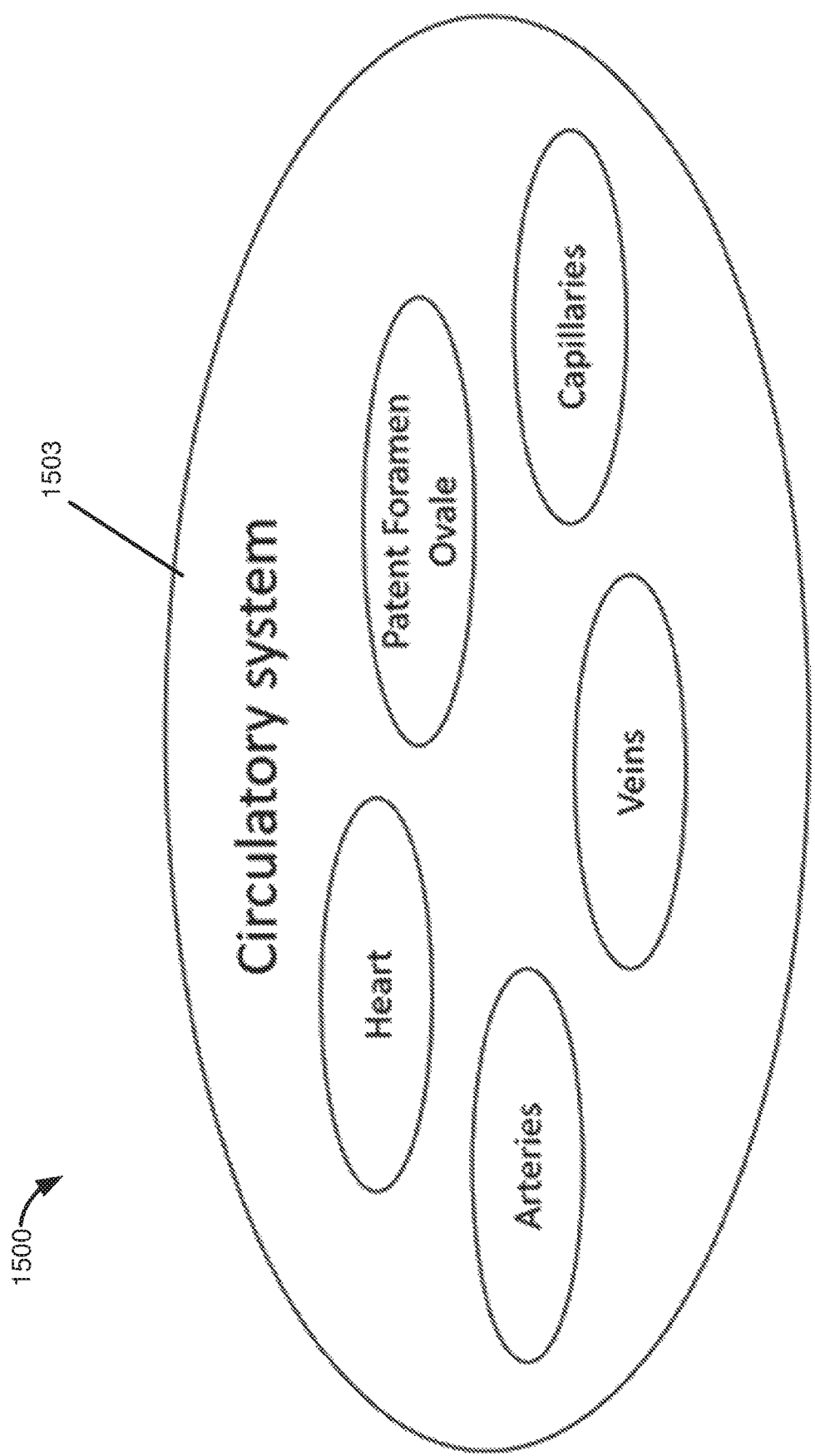
FIG. 15 shows a diagram of elements of a circulatory system that can be generated using structured data, according to an embodiment.

FIG. 15 shows a diagram 1500 of elements of a circulatory system 1503 that can be generated using structured data, according to an embodiment. The "circulatory system" element 1503 in FIG. 15 shown additional details of the "circulatory system" element 1402 in FIG. 14. The "circulatory system" element 1503 of FIG. 15 may be defined using structured data as shown in Listing 17 below:

Listing 17

```
<Circulatory data_type="JSON" structure_type="list"
presentation_type="Set_view" id="Circulatory">
    <![CDATA[
    {"Circulatory system":["Heart","Patent Foramen
Ovale","Arteries","Veins","Capillaries"]}
    ]]>
</Circulatory>
```

Figure 16:
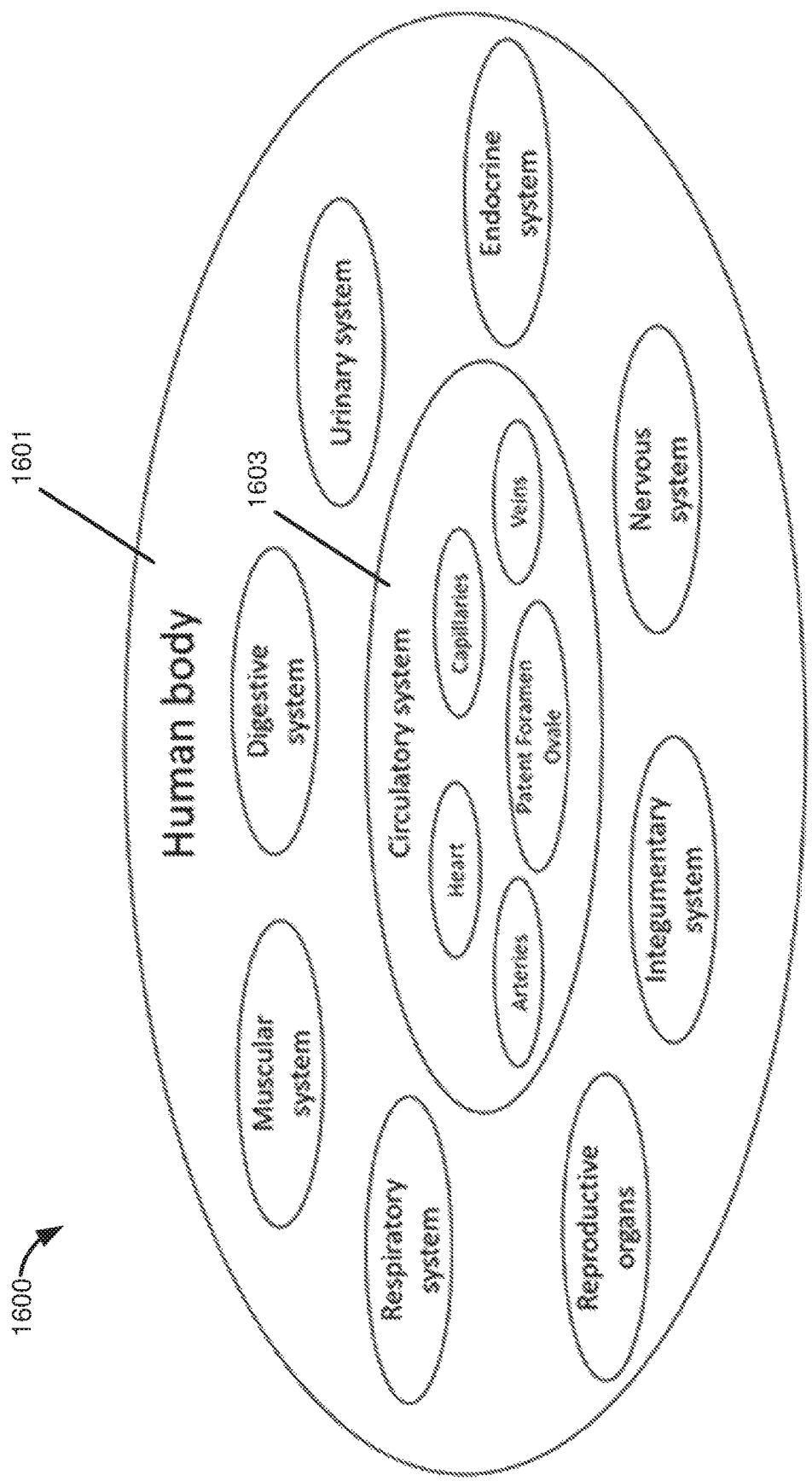
FIG. 16 shows a diagram of elements of human anatomy including a sub diagram of a circulatory system that can be generated using structured data, according to an embodiment.

Using links for structured data, the "circulatory system" element 1503 of FIG. 15 may be embedded as a sub diagram in the "human body" element 1401 of FIG. 14, replacing the "circulatory system" element 1402 of FIG. 14. FIG. 16 shows a diagram 1600 of elements of human anatomy 1601 including a subdiagram of a circulatory system 1603 that can be generated using structured data, according to an embodiment. To do this, an element is created to define the link between the keyword "Circulatory system" and the element "Circulatory," as shown in Listing 18 below:

Listing 18

```
<links id=body_links>
    <link key="Circulatory system" text="Circulatory system" target="nesting">Circulatory</link>
</links>
```

The attribute "text" may define the text displayed when the link is not triggered. When it is defined, the link may not be triggered when the current element is displayed on the screen. When the attribute "text" is not defined, the linked element may be displayed within the current element, as shown in FIG. 16. The attribute "target" may define the behavior when user clicks on the keyword. If "target" is "popup" then linked element is displayed in a popup window. If "target" is "blank," then the linked element may be displayed in a new tab. If "target" is "self," then the elements of the current window may be removed and the linked element may be displayed, as in FIG. 15. If the "target" is "nesting," then the linked element may be displayed inside the current element, as shown in FIG. 16.

Figure 17:
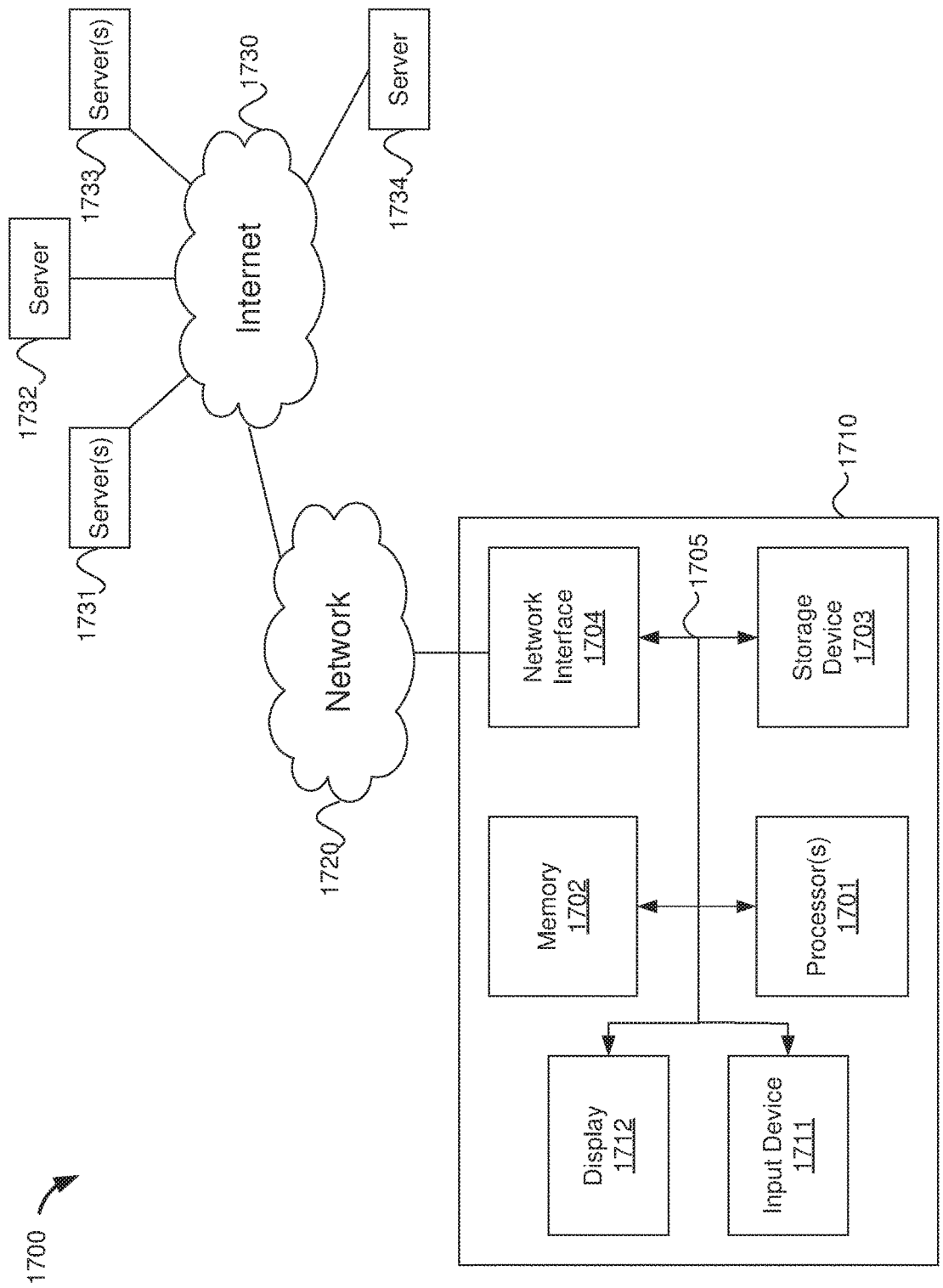
FIG. 17 shows a diagram of hardware of a special purpose computing machine for implementing systems and methods described herein, according to an embodiment.

FIG. 17 shows a diagram of hardware of a special purpose computing machine for implementing systems and methods described herein, according to an embodiment. The following hardware description is merely one example. It is to be understood that a variety of computers topologies may be used to implement the above described techniques. The hardware shown in FIG. 17 may be used to implement the client and client application described above.

An example computer system 1710 is illustrated in FIG. 17. The computer system 1710 includes a bus 1705 or other communication mechanism for communicating information, and one or more processor(s) 1701 coupled with bus 1705 for processing information. The computer system 1710 also includes a memory 1702 coupled to bus 1705 for storing information and instructions to be executed by processor 1701, including information and instructions for performing some of the techniques described above, for example. This memory may also be used for storing programs executed by processor(s) 1701. Possible implementations of this memory may be, but are not limited to, random access memory (RAM), read only memory (ROM), or both. A storage device 1703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1703 may include source code, binary code, or software files for performing the techniques above, for example. Storage device and memory are both examples of non-transitory computer readable storage mediums.

In summary, the type of document is somehow different from other documents. It can enclose various types of structured data, and besides the XML tree structure, the data is also connected with links. The type of document is not to replace other types of document, but it can be a good option for users if they want to read a book on which they can perform advanced manipulations such as searching, filtering, sorting, categorizing, etc. or write a book which can be utilized by computer in more advanced way.

The computer system 1710 may be coupled via bus 1705 to a display 1712 for displaying information to a computer user. An input device 1711 such as a keyboard, touchscreen, and/or mouse is coupled to bus 1705 for communicating information and command selections from the user to processor 1701. The combination of these components allows the user to communicate with the system. In some systems, bus 1705 represents multiple specialized buses, for example.

The computer system also includes a network interface 1704 coupled with bus 1705. The network interface 1704 may provide two-way data communication between computer system 1710 and a network 1720. The network interface 1704 may be a wireless or wired connection, for example. The computer system 1710 can send and receive information through the network interface 1704 across a local area network, an Intranet, a cellular network, or the Internet, for example. In the Internet example, a browser, for example, may access data and features on backend systems that may reside on multiple different hardware servers 1731-1734 across the network. The servers 1731-1734 may be part of a cloud computing environment, for example. The servers may provide the server functionality described above with respect to FIG. 1 and FIG. 2.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer device, comprising:
    one or more processors; and
    machine-readable medium coupled to the one or more processors and storing computer program code comprising sets instructions executable by the one or more processors to:
        obtain a document including structured data content, a data type indicator, and a structure type indicator;
        determine a parsing algorithm based on the data type indicator;
        determine a structure including a plurality of structure elements and a plurality of relationships between the plurality of structure elements by parsing the structured data content using the parsing algorithm and the structure type indicator; and
        generate a visualization of the structure including the plurality of structure elements and the plurality of relationships between the plurality of structure elements, wherein the structure is a first structure, wherein the structured data content is first structured data content, wherein the data type indicator is a first data type indicator, wherein the structure type indicator is a first structure type indicator, wherein the document includes a first document element comprising the first structured data content, the first data type indicator, the first structure type indicator, and a first link to a second document element, wherein the document further includes the second document element comprising second structured data content, a second data type indicator, and a second structure type indicator, and wherein the computer program code further comprises sets of instructions executable by the one or more processors to:

determine a second structure including a second plurality of structure elements and second a plurality of relationships between the second plurality of structure elements by parsing the second structured data content using the second structure type indicator; and generate a second visualization of the second structure including the second plurality of structure elements and the second plurality of relationships between the second plurality of structure elements, wherein the generation of the first visualization is based on the first link to the second document element, and wherein the first visualization includes the second visualization.

2. The computer device of claim 1, wherein the structured data content comprises a plurality of structure element values and a plurality of delimiters, wherein a lexical structure of the plurality of delimiters with respect to the plurality of structure element values reflects the plurality of relationships between the plurality of structure elements.

3. The computer device of claim 1, wherein the computer program code further comprises sets of instructions executable by the one or more processors to:

present the visualization of the structure in a user interface;

determine one or more inputs to the user interface to add to the visualization of the structure a first structure element and a first relationship between the first structure element and the plurality of structure elements;

modify the structured data content based on the data type indicator, the structure type indicator, and the one or more inputs to obtain modified structured data content;

determine a modified structure including the plurality of structure elements, the first structure element, the plurality of relationships, and the first relationship by parsing the modified structured data content using the parsing algorithm and the structure type indicator; and generate a second visualization of the modified structure including the plurality of structure elements, the first structure element, the plurality of relationships, and the first relationship.

4. The computer device of claim 1, wherein the computer program code further comprises sets of instructions executable by the one or more processors to:

present a text representation of the structured data content in a user interface;

determine one or more inputs to the user interface to modify the text representation of the structured data content;

modify the structured data content based on the one or more inputs to obtain modified structured data content;

determine a modified structure by parsing the modified structured data content using the parsing algorithm and the structure type indicator; and generate a third visualization of the modified structure.

5. The computer device of claim 1, wherein the document further includes a presentation type indicator, wherein the generation of the visualization is based on the presentation type indicator, and wherein the computer program code further comprises sets of instructions executable by the one or more processors to:

determine user interface event handlers based on the structure type indicator and the presentation type indicator, the user interface event handlers configured to initiate modification of the visualization in response to one or more user interface inputs.

6. The computer device of claim 1, wherein the document is an eXtensible Markup Language (XML) document, wherein the structured data content is included as character data in an XML element, and wherein the structure type indicator is an attribute of the XML element.

7. The computer device of claim 1, wherein the data type indicator indicates that the structured data content is formatted as eXtensible Markup Language (XML), JavaScript Object Notation (JSON), comma separated values (CSV) format, or nested parenthesis format.

8. The computer device of claim 1, wherein the structure type indicator indicates that the structure is a tree diagram, a relation diagram, a control flow diagram, a logic reasoning diagram, or a state chart.

9. One or more non-transitory computer-readable medium storing computer program code comprising sets of instructions to:

obtain a document including structured data content, a data type indicator, and a structure type indicator;

determine a parsing algorithm based on the data type indicator;

determine a structure including a plurality of structure elements and a plurality of relationships between the plurality of structure elements by parsing the structured data content using the parsing algorithm and the structure type indicator; and generate a visualization of the structure including the plurality of structure elements and the plurality of relationships between the plurality of structure elements, wherein the document includes a first document element comprising the first structured data content, the first data type indicator, the first structure type indicator, and a first link to a second document element, wherein the document further includes the second document element comprising second structured data content, a second data type indicator, and a second structure type indicator, and wherein the computer program code further comprises sets of instructions to:

determine a second structure including a second plurality of structure elements and second a plurality of relationships between the second plurality of structure elements by parsing the second structured data content using the second structure type indicator; and generate a second visualization of the second structure including the second plurality of structure elements and the second plurality of relationships between the second plurality of structure elements, wherein the generation of the first visualization is based on the first link to the second document element, and wherein the first visualization includes the second visualization.

10. The non-transitory computer-readable medium of claim 9, wherein the structured data content comprises a plurality of structure element values and a plurality of delimiters, wherein a lexical structure of the plurality of delimiters with respect to the plurality of structure element values reflects the plurality of relationships between the plurality of structure elements.

11. The non-transitory computer-readable medium of claim 9, wherein the computer program code further comprises sets of instructions to:
   present the visualization of the structure in a user interface;
   determine one or more inputs to the user interface to add to the visualization of the structure a first structure element and a first relationship between the first structure element and the plurality of structure elements;
   modify the structured data content based on the data type indicator, the structure type indicator, and the one or more inputs to obtain modified structured data content;
   determine a modified structure including the plurality of structure elements, the first structure element, the plurality of relationships, and the first relationship by parsing the modified structured data content using the parsing algorithm and the structure type indicator; and
   generate a second visualization of the modified structure including the plurality of structure elements, the first structure element, the plurality of relationships, and the first relationship.

12. The non-transitory computer-readable medium of claim 9, wherein the computer program code further comprises sets of instructions to:
   present a text representation of the structured data content in a user interface;
   determine one or more inputs to the user interface to modify the text representation of the structured data content;
   modify the structured data content based on the one or more inputs to obtain modified structured data content;
   determine a modified structure by parsing the modified structured data content using the parsing algorithm and the structure type indicator; and
   generate a third visualization of the modified structure.

13. The non-transitory computer-readable medium of claim 9, wherein the document further includes a presentation type indicator, wherein the generation of the visualization is based on the presentation type indicator, and wherein the computer program code further comprises sets of instructions to:
   determine user interface event handlers based on the structure type indicator and the presentation type indicator, the user interface event handlers configured to initiate modification of the visualization in response to one or more user interface inputs.

14. The non-transitory computer-readable medium of claim 9, wherein the document is an eXtensible Markup Language (XML) document, wherein the structured data content is included as character data in an XML element.

15. A computer-implemented method, comprising:
   obtaining a document including structured data content, a data type indicator, and a structure type indicator;
   determining a parsing algorithm based on the data type indicator;
   determining a structure including a plurality of structure elements and a plurality of relationships between the plurality of structure elements by parsing the structured data content using the parsing algorithm and the structure type indicator; and
   generating a visualization of the structure including the plurality of structure elements and the plurality of relationships between the plurality of structure elements,
   wherein the structure is a first structure, wherein the structured data content is first structured data content, wherein the data type indicator is a first data type indicator, wherein the structure type indicator is a first structure type indicator,
   wherein the document includes a first document element comprising the first structured data content, the first data type indicator, the first structure type indicator, and a first link to a second document element,
   wherein the document further includes the second document element comprising second structured data content, a second data type indicator, and a second structure type indicator, and
   wherein the method further comprises:
      determining a second structure including a second plurality of structure elements and second a plurality of relationships between the second plurality of structure elements by parsing the second structured data content using the second structure type indicator; and
      generating a second visualization of the second structure including the second plurality of structure elements and the second plurality of relationships between the second plurality of structure elements, wherein the generation of the first visualization is based on the first link to the second document element, and wherein the first visualization includes the second visualization.

16. The computer-implemented method of claim 15, wherein structured data content comprises a plurality of structure element values and a plurality of delimiters, wherein a lexical structure of the plurality of delimiters with respect to the plurality of structure element values reflects the plurality of relationships between the plurality of structure elements.

17. The computer-implemented method of claim 15, further comprising:
   presenting the visualization of the structure in a user interface;
   determining one or more inputs to the user interface to add to the visualization of the structure a first structure element and a first relationship between the first structure element and the plurality of structure elements;
   modifying the structured data content based on the data type indicator, the structure type indicator, and the one or more inputs to obtain modified structured data content;
   determining a modified structure including the plurality of structure elements, the first structure element, the plurality of relationships, and the first relationship by parsing the modified structured data content using the parsing algorithm and the structure type indicator; and
   generating a second visualization of the modified structure including the plurality of structure elements, the first structure element, the plurality of relationships, and the first relationship.

18. The computer-implemented method of claim 15, further comprising:
   presenting a text representation of the structured data content in a user interface;

determining one or more inputs to the user interface to modify the text representation of the structured data content;

modifying the structured data content based on the one or more inputs to obtain modified structured data content;

determining a modified structure by parsing the modified structured data content using the parsing algorithm and the structure type indicator; and generating a third visualization of the modified structure.

19. The computer-implemented method of claim 15, wherein the structured data content comprises a plurality of structure element values and a plurality of delimiters, wherein a lexical structure of the plurality of delimiters with respect to the plurality of structure element values reflects the plurality of relationships between the plurality of structure elements.

20. The computer-implemented method of claim 15, wherein the document further includes a presentation type indicator, wherein the generation of the visualization is based on the presentation type indicator, and wherein the method further comprises:

determine user interface event handlers based on the structure type indicator and the presentation type indicator, the user interface event handlers configured to initiate modification of the visualization in response to one or more user interface inputs.

21. The computer-implemented method of claim 15, wherein the document is an eXtensible Markup Language (XML) document, wherein the structured data content is included as character data in an XML element.

* * * * *